(12) United States Patent
Matsuda

(10) Patent No.: US 10,569,455 B2
(45) Date of Patent: Feb. 25, 2020

(54) MANUFACTURING METHOD AND MANUFACTURING DEVICE FOR RESIN FAN

(71) Applicant: MATSUDAKANAGATAKOGYO CO., LTD., Arakawa-ku, Tokyo (JP)

(72) Inventor: Masao Matsuda, Tokyo (JP)

(73) Assignee: Matsudakanagatakogyo Co., Ltd., Tokyo (JP)

( * ) Notice: Subject to any disclaimer, the term of this patent is extended or adjusted under 35 U.S.C. 154(b) by 314 days.

(21) Appl. No.: 15/544,411

(22) PCT Filed: Aug. 12, 2015

(86) PCT No.: PCT/JP2015/072879
§ 371 (c)(1),
(2) Date: Jul. 18, 2017

(87) PCT Pub. No.: WO2016/125329
PCT Pub. Date: Aug. 11, 2016

(65) Prior Publication Data
US 2018/0001524 A1    Jan. 4, 2018

(30) Foreign Application Priority Data

Feb. 2, 2015   (JP) .................................. 2015-018790
Jun. 4, 2015   (JP) .................................. 2015-113778

(51) Int. Cl.
*B29C 45/16*   (2006.01)
*B29C 45/12*   (2006.01)
(Continued)

(52) U.S. Cl.
CPC .......... *B29C 45/12* (2013.01); *B29C 45/0441* (2013.01); *B29C 45/1635* (2013.01);
(Continued)

(58) Field of Classification Search
None
See application file for complete search history.

(56) References Cited

U.S. PATENT DOCUMENTS

2002/0051707 A1   5/2002   Takahashi et al.

FOREIGN PATENT DOCUMENTS

| JP | 2002-202095 A | 7/2002 |
| JP | 2010-264687 A | 11/2010 |

(Continued)

OTHER PUBLICATIONS

International Search Report (PCT/ISA/210) dated Sep. 29, 2015, by the Japanese Patent Office as the International Searching Authority for International Application No. PCT/JP2015/072879.
(Continued)

*Primary Examiner* — Edmund H Lee
(74) *Attorney, Agent, or Firm* — Buchanan Ingersoll & Rooney PC

(57) ABSTRACT

A resin fan includes a semi-molded article in which a first circular plate and blades are integrated. While the semi-molded article is retained, a composite mold is moved to a secondary molding side, a second mold is put in a first position and a third mold is moved to the first position and inserted into the first mold. An intermediate part extends over the inner surface-side of a large-bend part, and causes the end of the third mold to engage with the first mold. Next, resin is poured into a secondary forming mold, and a second circular plate is integrally molded continuous with the blades of the semi-molded article, and a fan is molded. Together with the opening of the second mold and the composite mold, the third mold and the composite mold are opened, each of the molds is moved to a second position.

7 Claims, 19 Drawing Sheets

(51) Int. Cl.
    *F04D 29/02*     (2006.01)
    *B29C 45/33*     (2006.01)
    *F04D 29/30*     (2006.01)
    *B29C 45/04*     (2006.01)
    *B29C 45/17*     (2006.01)
    *F04D 29/28*     (2006.01)
    *B29L 31/08*     (2006.01)

(52) U.S. Cl.
    CPC .......... *B29C 45/1742* (2013.01); *B29C 45/33* (2013.01); *F04D 29/023* (2013.01); *F04D 29/281* (2013.01); *F04D 29/30* (2013.01); *B29C 2045/1637* (2013.01); *B29C 2045/334* (2013.01); *B29C 2045/336* (2013.01); *B29L 2031/082* (2013.01); *F05D 2300/44* (2013.01); *F05D 2300/603* (2013.01)

(56) References Cited

FOREIGN PATENT DOCUMENTS

| | | |
|---|---|---|
| JP | 2011-038445 A | 2/2011 |
| JP | 2012-148562 A | 8/2012 |
| JP | 2014-008615 A | 1/2014 |

OTHER PUBLICATIONS

Written Opinion (PCT/ISA/237) dated Sep. 29, 2015, by the Japanese Patent Office as the International Searching Authority for International Application No. PCT/JP2015/072879.

120

FIG. 6
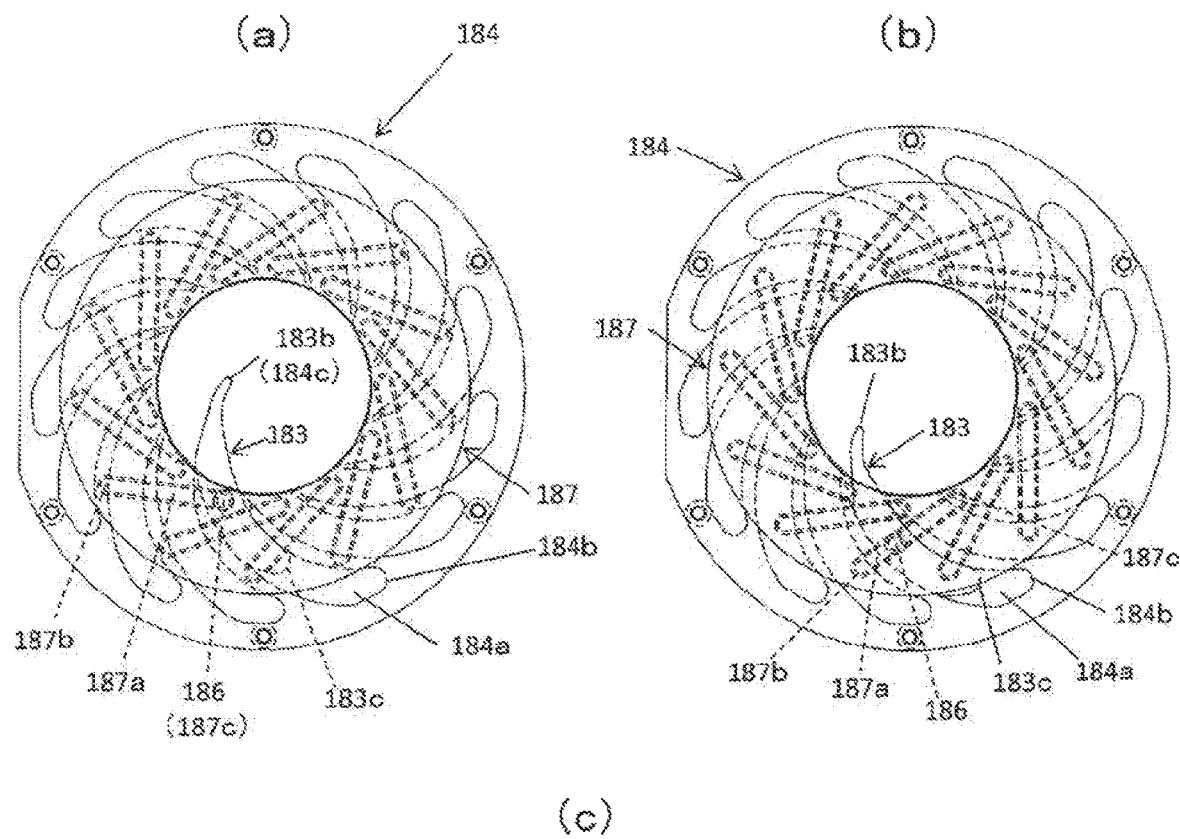
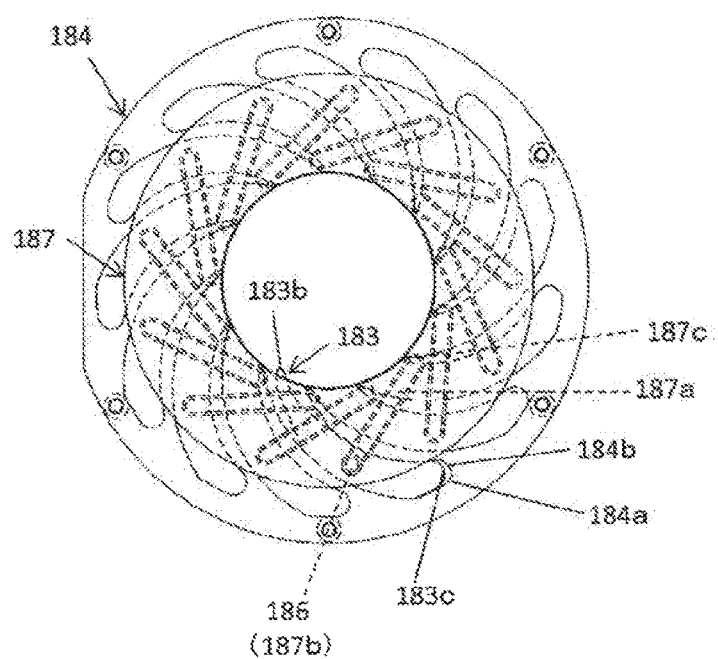

FIG. 12
(a)
(b)
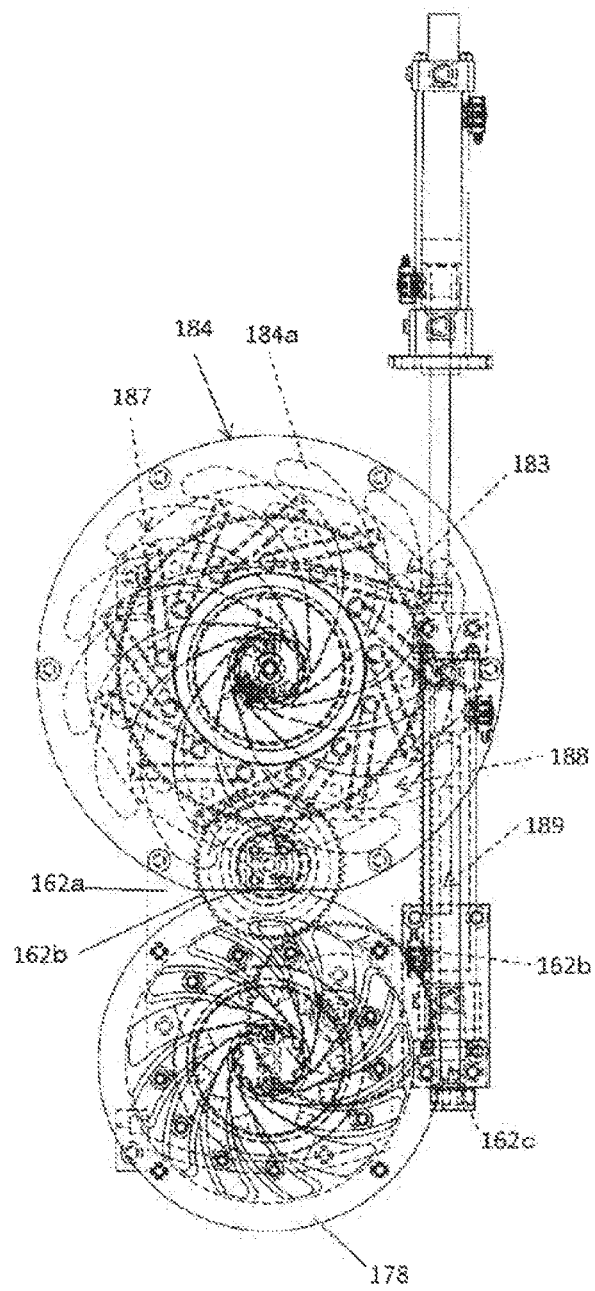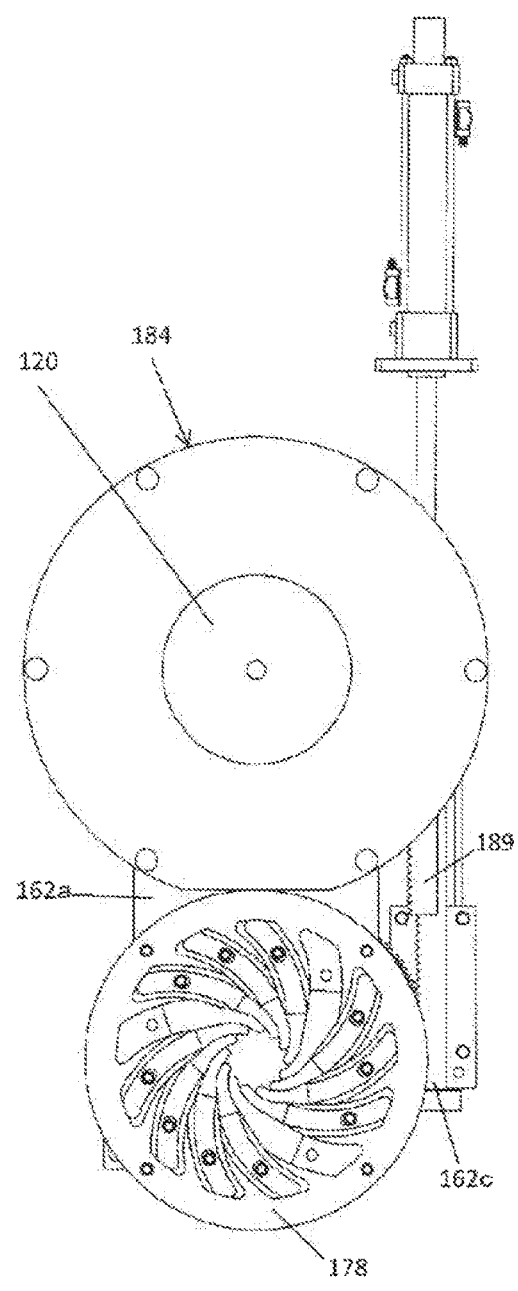

FIG. 15
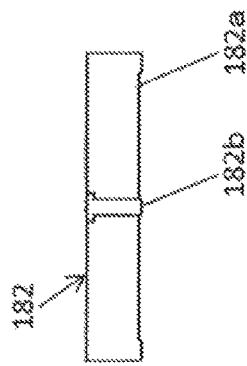
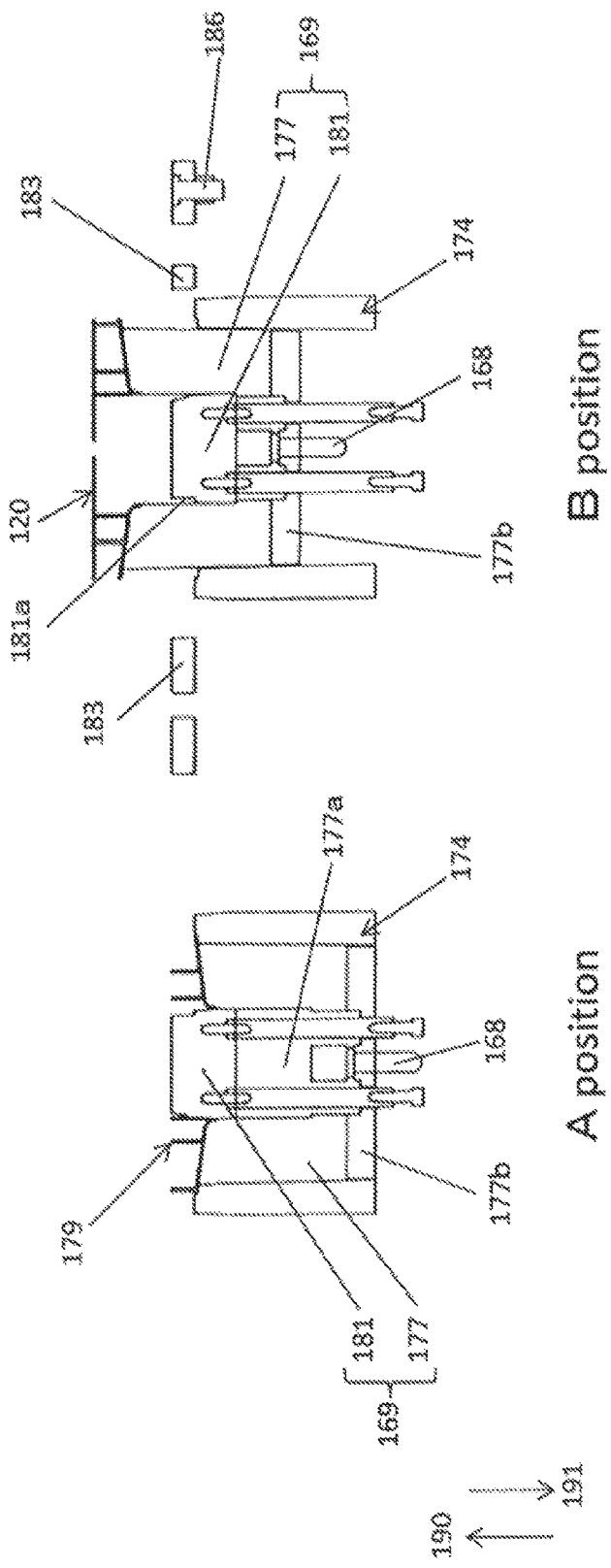

FIG. 16
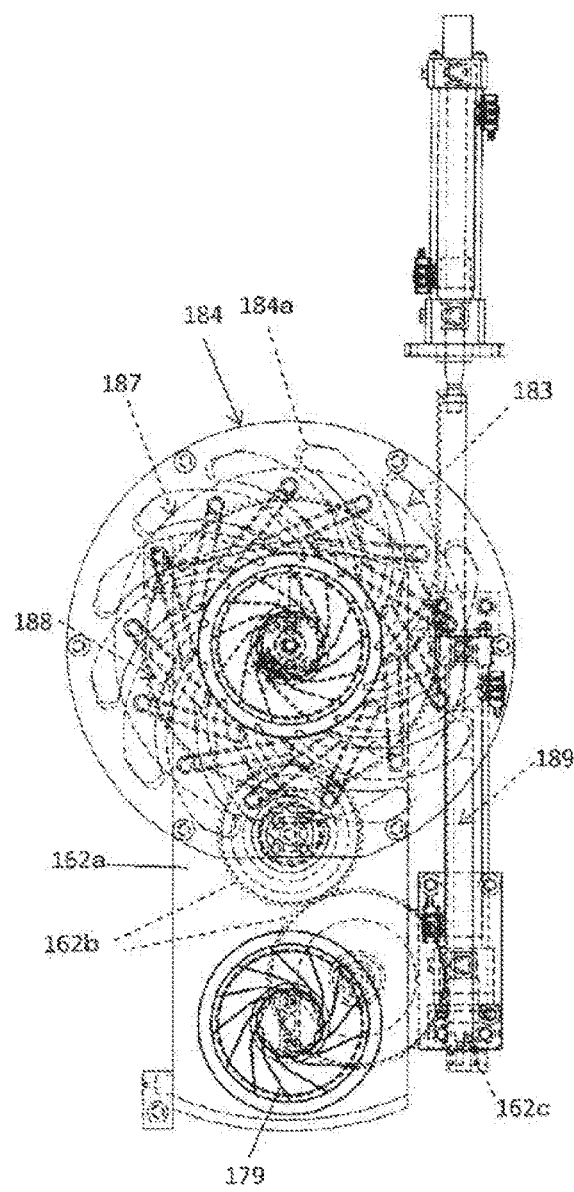
(a)
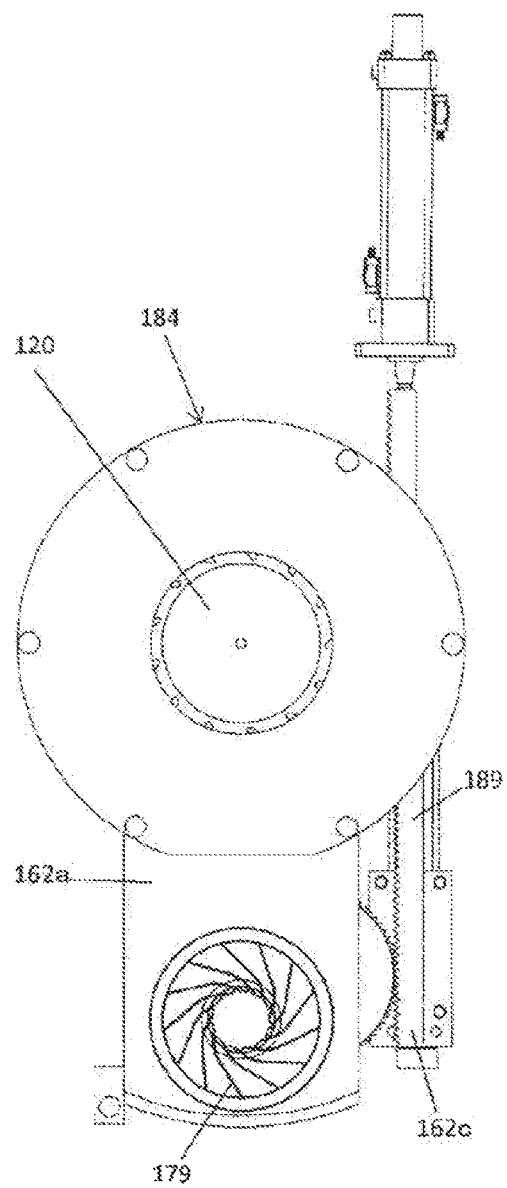
(b)

FIG. 20
(a) (b)
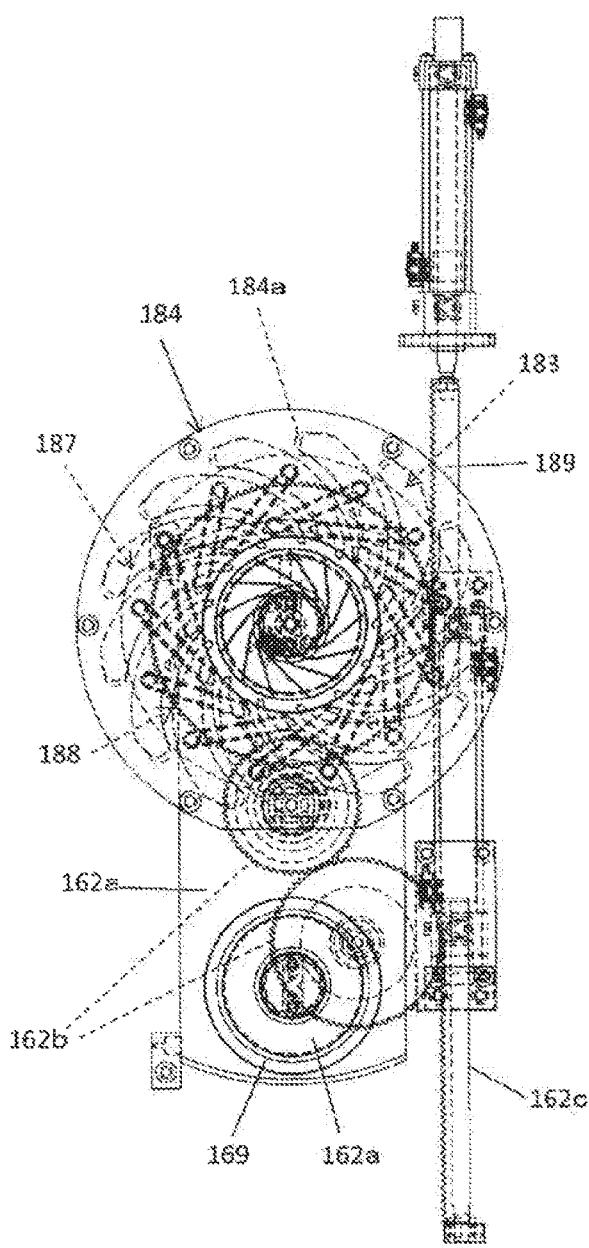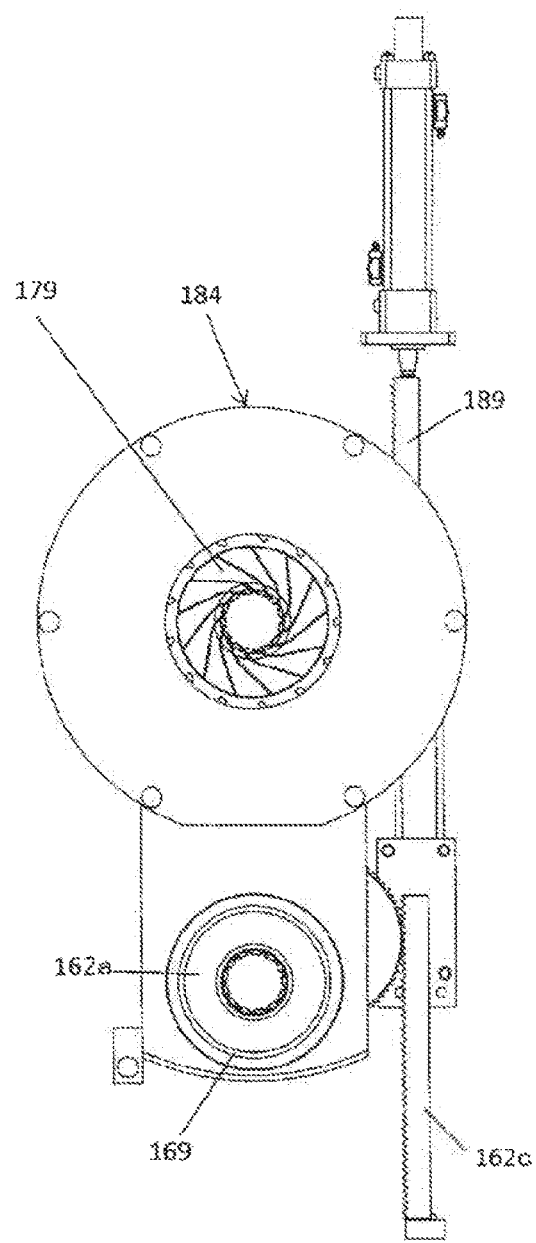

MANUFACTURING METHOD AND MANUFACTURING DEVICE FOR RESIN FAN

BACKGROUND

Technical Field

The present invention relates to a method of and an apparatus for manufacturing a resin fan for use in transporting a fluid by means of a pump or the like wherein the resin fan can be molded with any suitable resin material by using a two-stage molding process.

Description of the Prior Art

For the conventional fan that is structured such that the blades arranged radially and held securely between the two circular plates are molded so that they are so formed as to be bent in the circumferential direction of the circular plates and a fluid introducing channel is formed between any two adjacent blades, the fluid introducing channel (blade) being wider (higher) on the inner peripheral side thereof and narrower (lower) on the outer peripheral side thereof, it has been found that it is difficult to mold the fan with resin in such that the circular plates and the blades can be united together into one unit by the integral molding process. In manufacturing the conventional fan, therefore, the one circular plate having the blades molded thereon and the other circular plate opposite the one circular plate are molded separately from each other, and those circular plates are then joined by using the ultrasound joining method or the like. It is noted, however, that there is a problem that the interface as joined between the two circular plates will become less durable when the fan is rotating at high speeds.

To avoid the above problem, one inventor proposes to provide an invention that eliminates the need of relying on any joining method and permits the fan to be manufactured by using the two slide cores to integrally mold the two circular plates (Patent Document 1).

Another inventor proposes to provide an invention that improves the invention disclosed in Patent Document 1, that is, the invention that permits the fan to be manufactured by integrally molding the two circular plates more securely (Patent Document 2).

Both of the inventions disclosed in Patent Documents 1 and 2 relate to a mold for and a method of integrally molding a resin fan with resin by holding the radial blades between the two circular plates each having a central opening portion formed thereon.

PRIOR TECHNICAL DOCUMENTS

Patent Documents

Patent Document 1: Patent application 2010-264687 opened for the public examination
Patent Document 2: Patent application 2012-148562 opened for the public examination

SUMMARY OF THE INVENTION

The fan may have various forms, the choice of which may depend on the mechanisms, devices and the like to which the fan will be mounted. Specifically, the fan such as the one shown in FIG. 2 has the form in which it includes a first circular plate and a second circular plate, the first circular plate having a large bend at the central opening portion thereof and the central opening portion on the first circular plate being located away from the inner side of the second circular plate on the inner peripheral side of the first circular plate. It is known that the fan having this form can create a large amount of wind, and is well suited for use in transporting a fluid.

In the inventions disclosed in Patent Documents 1 and 2, however, it has been found that it is difficult to integrally mold the fan, such as the one described above, that has the form in which it includes the first circular plate and the second circular plate, the first circular plate having a large bend at the central opening portion thereof and the central opening portion on the first circular plate being located away from the inner side of the second circular plate on the inner peripheral side of the first circular plate.

As opposed to the two inventions mentioned above, it is a principal object of the present invention to provide a method of and an apparatus for efficiently manufacturing a resin fan that is well suited for use in transporting a fluid, wherein the fan has the form in which the one circular plate has a large bend at the central opening portion and the central opening portion on the one circular plate is located away from the inner side of the other circular plate on the inner peripheral side of the one circular plate.

An embodiment of the invention provides a method of manufacturing a resin fan that includes a multitude of blades arranged radially from the center and held securely between a first circular plate and a second circular plate aligned at the center with each other, said resin fan being molded with resin by using a two-stage molding process, the method comprising forming a resin fan on a primary forming mold and a secondary forming mold, both of which will be described below, wherein (1) said resin fan is molded into a particular shape in the following way in which
  (a) said blades are so formed as to be bent and that the bend so formed has a convex surface in the direction of one complete revolution;
  (b) said blade is molded such that it has a height of $H_{01}$ on the side of the outer peripheral edge thereof, said height increasing gradually toward the inner peripheral side, and that it has a height of $H_{02}$ ($>H_{01}$) on the side of the inner peripheral edge thereof; and
  (c) said first circular plate includes a first central opening portion;
(2) said primary forming mold includes:
  (a) a first circular plate forming mold for molding the outer side and the outer peripheral edge on said first circular plate;
  (b) a first mold for molding the first central opening portion of said first circular plate;
  (c) a blade forming mold for molding said blades on the inner side of said first circular plate, in which
  (d) said blade forming mold and said first circular plate forming mold, said blade forming mold and said first mold can be moved to a molding position in which a semi-molded article including said first circular plate and said blades is to be molded by being brought closer to each other and to a non-molding position by being brought away from each other;
(3) said secondary forming mold includes:
  (a) said first mold;
  (b) a seconds mold for molding said second central opening portion, said outer side and said outer peripheral edge on said second circular plate;

(c) a third mold for molding the inner side of said second circulate plate by being inserted into the corresponding gap formed between any two blades adjacent to each other and disposed radially in close proximity of the circumference of said first mold such that it can engage closely the lateral wall of one blade located in said corresponding gap and that it can engage closely the lateral wall of another blade located in said corresponding gap;

(d) said second mold and said first mold can be moved to the molding position in which said fan is to be molded from said semi-molded article by being brought closer to each other and to the non-molding position by being brought away from each other; and (e) said third mold can be moved to a first position in which it is located on the centrifugal side by being brought closer to said first mold and to a second position in which it is brought away from said first mold toward the radial side, said third mold placed in said first position being inserted into the corresponding gap formed between said two blades adjacent to each other so that the inner side of said second circulate plate can be molded;

(4) said semi-molded article and said fan are molded in the following sequence:

(a) said blade forming mold, said first circulate plate forming mold and said first mold are closed so that they can be moved from said non-molding position to a molding position in which said semi-molded article is to be molded, and any suitable resin material is poured into said blade forming mold, said first circulate plate forming mold and said first mold for molding said semi-molded article during the primary molding stage;

(b) said semi-molded article is moved from said primary forming mold to said first mold that forms part of said secondary forming mold;

(c) in said first position, said third mold is inserted into each corresponding one of the gaps formed between any two adjacent blades of said semi-molded article; in the molding position in which said fan is to be molded, said second mold and said first mold are closed; and during the secondary molding stage, any suitable resin material is poured into said first mold, said second mold and said third mold so that said fan can be molded by integrally molding said second circular plate and said semi-molded article, and (d) said second mold and said first mold are opened so that the molding position in which said fan has been completely molded can be moved to the non-molding position and that in said second position, said third mold can be brought away from said first mold and said fan as completely molded is then removed.

Another embodiment of the invention provides an apparatus for manufacturing a resin fan that includes a multitude of blades arranged radially from the center and held securely between a first circular plate and a second circular plate aligned at the center with each other, said resin fan being molded on a two-stage molding process including a primary forming mold and a secondary forming mold, the apparatus comprising the following structure wherein (1) said resin fan is molded into a particular shape in the following way in which (a) said blades are so formed as to be bent and that the bend so formed has a convex surface in the direction of one complete revolution;

(b) each of said blades is molded such that it has a height of $H_{o1}$ on the side of the outer peripheral thereof, said height increasing gradually toward its inner peripheral side and that it has a height of $H_{o2}$ ($>H_{o1}$) on the side of the inner peripheral thereof; and (c) said first circular plate includes a first central opening portion;

(2) with each of the molds being closed, said primary forming mold is the mold on which a semi-molded article including said first circular plate and said blades united together into one unit is to be molded, and includes the molds described below:

(a) a first circular plate forming mold for molding an outer side and an outer peripheral edge on said first circulate plate;

(b) a first mold for molding a first central opening portion on said first circular plate;

(c) a blade forming mold for molding said blades on the inner side of said first circular plate; and further includes:

(d) means for moving said blade forming mold and said first circular plate forming mold, said blade forming mold and said first mold to the position in which said semi-molded article is to be molded by being brought closer to each other and to a non-molding position by being brought away from each other;

(3) with all of the molds being closed, said secondary forming mold is the mold on which said resin fan is to be molded by uniting said semi-molded article and said second circular plate together, and includes the molds described below:

(a) said first mold;

(b) a seconds mold for molding an outer side and an outer peripheral edge on said second circular plate;

(c) a third mold for molding the inner side of said second circular plate by being inserted into a corresponding gap formed between any two adjacent blades arranged radially in close proximity of the circumference of said first mold so that said third mold can engage closely the lateral wall of one blade located in said corresponding gap and that said third mold can engage closely the lateral wall of the other blade located in said corresponding gap;

(d) means is provided for moving said second mold and said first mold to the molding position in which said fan is to be molded from said semi-molded article by bringing those two molds closer to each other and for moving said second mold and said first mold to the non-molding position by bringing those two molds away from each other;

(e) means is provided for opening and closing said third mold so that said third mold can be moved to a first position located on the centrifugal side by being brought closer to said first mold and that said third mold can be moved to a second position located radially away from said first mold, said third mold having the structure in which in said first position, said third mold is inserted into a corresponding gap formed between said any two adjacent blades so that it can mold the inner side of said second circular plate;

(f) said first mold has a recessed portion that engages the forward end of said third mold by being fitted into said forward end; and (g) said third mold is inserted into said corresponding gap and has a projecting portion that allows it to engage said first mold by allowing its forward end to be fitted into said recessed portion on said first mold; and (4) two composite molds are provided, each of said composite molds having the functions provided by combining said first circular plate forming mold with said first mold, and means is provided for allowing each composite mold to move to the position that corresponds to said blade forming mold and to the position that corresponds to said second mold, the movement of each composite mold occurring alternately between those two positions.

Advantages of the Invention

As one of its advantages, the present invention can provide a method of and an apparatus for efficiently manufacturing a resin fan that is well suited for use in transporting a fluid, wherein the fan has the form in which the one circular plate has a large bend so formed as to be bent largely at the central opening portion and the central opening portion on the one circular plate is located away from the inner side of the other circular plate on the inner peripheral side of the one circular plate.

BRIEF DESCRIPTION OF DRAWINGS

FIG. 6 represents only one of the third molds and is a diagram for explaining the movement of that one third mold in which (a) shows the state in which the mold is closed, (b) shows the state in which the mold is moving and (c) shows the state in which the mold is opened;

FIGS. 12(a) and (b) are both a plan view illustrating the fan manufacturing apparatus shown in FIG. 9 although some parts are omitted in which (a) represents the primary forming mold, the secondary forming mold and the rotary plate shown in perspective;

FIG. 15 represents the primary forming mold and the secondary forming mold shown on an enlarged scale in FIG. 14;

FIGS. 16(a) and (b) are both a plan view illustrating the fan manufacturing apparatus shown in FIG. 13 although some parts are omitted in which (a) represents the primary forming mold and the rotary plate which are shown in perspective;

FIGS. 20(a) and (b) are both a plan view illustrating the fan manufacturing apparatus in FIG. 17 although some parts are omitted in which (a) represents the primary forming mold and the rotary plate which are shown in perspective.

BEST MODE OF EMBODYING THE INVENTION

One example of one embodiment of the present invention is now described below by referring to the accompanying drawings. In this embodiment, a method of and an apparatus for manufacturing a resin fan with resin in the two-stage molding process will be described, wherein the fan has the form in which a multitude of blades arranged radially from the center are held securely between a first circular plate and a second circular plate aligned at the center with each other, the one circular plate having a large bend so formed as to be bent largely at the central opening portion and the central opening portion on said one circular plate being located away from the inner side of the other circular plate on the inner peripheral side of said one circular plate.

(Structure of a Fan to be Molded)

Figure 1:
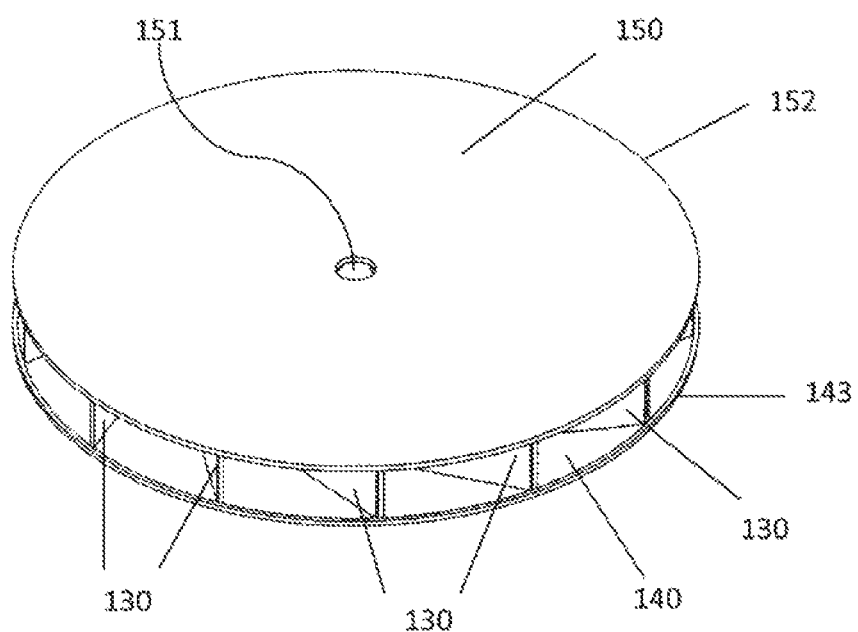
FIG. 1 represents one example of the fan that is manufactured in accordance with the present invention in which the fan is shown in perspective as it is viewed from the bottom side thereof.
Figure 2:
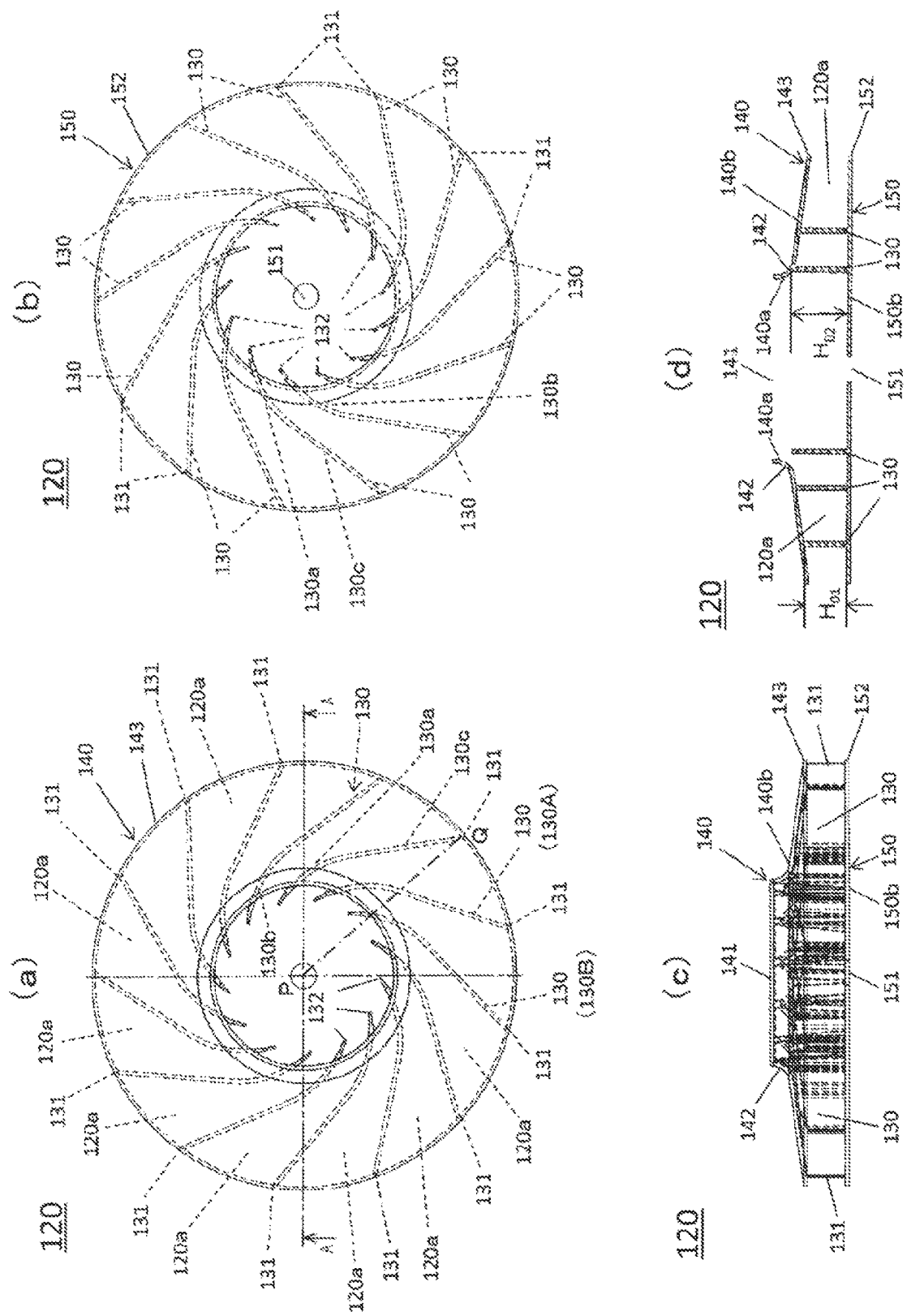
FIG. 2 represents the fan shown in FIG. 1 in which (a) is a plan view, (b) is a bottom view, (c) is a front view and (d) is a sectional view taken along the line A-A.

(1) As shown in FIG. 1 and FIG. 2, the resin fan 120 includes a multitude of blades 130, 130 arranged obliquely and radially from the center P and held securely between a first circular plate 140 and a second circular plate 150 aligned at the center P with each other. It may be seen from FIG. 1 and FIG. 2 that the first circular plate 140 and the second circular plate 150 have the same external diameter, and so the outer peripheral edge 143 of the first circular plate 140 and the outer peripheral edge 152 of the second circular plate 150 are aligned with each other.

In the following description, it should be understood from FIG. 2(d) that one side of the first circular plate 140 located on the side of the blade 130 will be referred to as the inner side 140a and the other side will be referred to as the outer side 140b. Similarly, one side of the second circular plate 150 located on the side of the blade 130 will be referred to as the inner side 150a and the other side will be referred to as the outer side 150b.

(2) As shown in FIG. 2, the first circular plate 140 includes a first central opening portion 141 with a great circle that is formed thereon such that it is coaxial with the first circular plate 140. As shown in FIGS. 2(a) and (b), the first circular plate 140 further includes a large bend 142 that is so formed as to be bent largely such that the first central opening portion 141 is located away from the inner side 150a of the second circular plate 150 on the inner peripheral side of the first circular plate 140.

(3) As shown in FIG. 2, the second circular plate 150 includes a second central opening portion 151 with a smaller circle than the circle on the first central opening portion 141 such that it is coaxial with the second circular plate 150.

In addition to the structure shown in FIG. 2, the second circular plate 150 may include a small bend that is so formed as to be bent such that the second central opening portion 151 is located away from the inner side 140a of the first circular plate 140 on the inner peripheral side of the second circular plate 150 (see the small bend 42 in the fan 10 shown in FIG. 3 that will be described later).

(4) Each of the blades 130 is so formed as to be bent such that its forward end portion on the inner peripheral side can provide a convex surface in the direction of one complete revolution (the lateral wall 130*a* on the convex surface side and the lateral wall 130*b* on the concave side). It also includes a flat section 130*c* extending from the intermediate part to the outer peripheral edge 131.

It is seen from FIG. 2(*a*) that along the straight line PQ connecting between the center P of the fan 120 (the center P of both circular plates 140 and 150 aligned with each other, the center P of each blade 130) and the outer peripheral edge 131 of one blade 130, another blade 130 (130A) adjacent to the lateral wall 130*b* of the one blade 130 on the concave side has the flat section 130*c* whose neighborhood intersects the neighborhood of corresponding flat section of the one blade 130.

Furthermore, still another blade 130 (130B) adjacent to the lateral wall 130*b* of said another blade 130 (130A) on the concave side has the inner peripheral edge 132 whose neighborhood intersects that of said another blade 130A.

More specifically, with regard to the straight line PQ connecting between the center P of the fan 120 and the outer peripheral edge 131 of the one blade 130, the neighborhood of the flat section 130*c* on the another blade 130 (130A) adjacent to the lateral wall 130*b* of the one blade 130 on the concave side and the inner peripheral edge 132 of the still anther blade 130 (130B) adjacent to the lateral wall 130*b* of the another blade 130 (130A) are located closer to the one blade 130 than the straight line PQ.

As shown in FIG. 2(*d*), the blade 130 is formed so that it has a height of $H_{01}$ on the side of its outer peripheral edge 131, the height increasing gradually toward the inner peripheral edge 132 and that it has a height of $H_{02}$ on the side of its inner peripheral edge 132.

(5) As shown in FIG. 2, the fan 120 includes a fluid introducing channel (gap) 120*a* that will be formed between any two adjacent blades 130 when the fan 120 is actually operated. The fluid introducing channel 120*a* has the form that corresponds to the respective forms of the lateral wall 130*a* on the convex side, the lateral wall 130*b* on the concave side and the flat sections 130*c* of any two adjacent blades 130, 130.

It is seen from FIG. 2(*d*) that the fluid introducing channel 120*a* is so formed that it has a bend corresponding to the large bend 142 of the first circular plate 140.

It is also seen from FIG. 2 that the fluid introducing channel 120*a* is surrounded by the lateral wall 130*a* of one blade 130 on the convex surface side, the lateral wall 130*b* of the other blade 130 on the concave surface side, the inner side 140*a* of the first circular plate 140 and the inner side 150*a* of the second circular plate 150*a*.

(6) The first central opening portion 141 and the second central opening portion 151 are the outlet ports through which the fluid delivered from the fluid introducing channel 120*a* is expelled (or the inlet ports through which the fluid is delivered into the fluid introducing channel 120*a*).

(7) As one example of this embodiment, thirteen (13) blades 130, 130 are arranged at equal intervals in the circumferential direction. The number of the blades 130 so arranged may be determined optionally.

Figure 3:
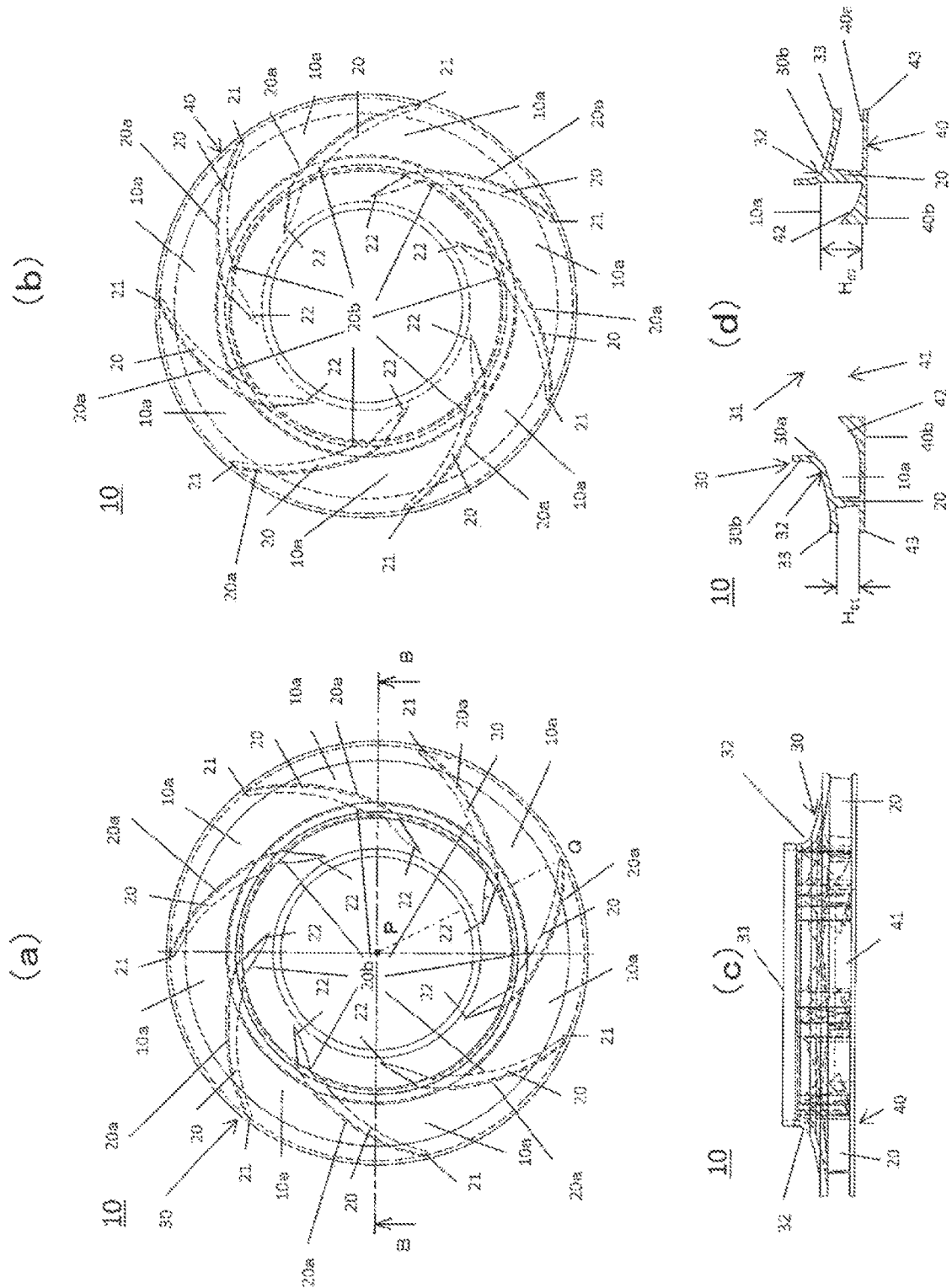
FIG. 3 represents another example of the fan that is manufactured in accordance with the present invention in which (a) is a plan view, (b) is a bottom view, (c) is a front view and (d) is a sectional view taken along the line B-B.

(8) In the example shown in FIG. 3, the fan 10 may include seven (7) blades 20 arranged at equal intervals in the circumferential direction.

(9) The fan 10 shown in FIG. 3 has the structure in which the seven blades 20, 20 are arranged obliquely and radially from the center P and are held securely between a first circular plate 30 and a second circular plate 40 aligned at the center P with each other.

It is seen from FIG. 3 that the first circular plate 30 and the second circular plate 40 have the same external diameter, and have the respective outer peripheral edges 33, 43 aligned with the outer peripheral edges 21 of the blades 20, 20.

In the following description and as shown in FIG. 3(*d*), one side of the first circular plate 30 facing the side of the blade 20 will be referred to as the inner side 30*a* and the other side will be referred to as the outer side 30*b*. Similarly, one side of the second circular plate 40 facing the side of the blade 20 will be referred to as the inner side 40*a* and the other side will be referred to as the outer side 40*b*.

It is seen from FIG. 3 that the first circular plate 30 includes the first central opening portion 31 with the large circle so formed that it is coaxial with the first circular plate 30. It is also seen from FIGS. 3(*c*) and (*d*) that the first circular plate 30 has the large bend 32 so formed as to be bent largely and that the first central opening portion 31 is located away from the inner side 40*a* of the second circular plate 40*a* on the inner peripheral side of the first circular plate 30.

As shown in FIG. 3, the second circular plate 40 includes a second central opening portion 41 with a smaller circle than that of the first circular plate 31 so that it is coaxial with the second circular plate 40. As shown in FIG. 3(*d*), the second circular plate 40 also includes a small bend 42 so formed as to be bent and that the second central opening portion 41 is located closer to the inner side 30 of the first circular plate 30 on the inner peripheral side of the second circular plate 40.

Each of the blades 20, 20 is so formed as to be bent so that it can provide a convex surface in the direction of one complete revolution (the lateral wall 20*a* on the convex surface side and the lateral wall 20*b* on the concave surface side).

It is seen from FIG. 3(*a*) that along the straight line PQ connecting between the center P of the fan 10 (the center P of both circular plates 30, 40 aligned with each other, the center P of each blade 20) and the outer peripheral edge 21 of one blade 20, another blade 20 adjacent to the lateral wall 20*b* of the one blade 20 on the concave surface side has the inner peripheral edge 22 whose neighborhood intersects the neighborhood of the lateral wall of the one blade 20.

More specifically, with regard to the straight line PQ connecting between the center P of the fan 10 and the outer peripheral edge 21 of the one blade 20, the inner peripheral edge 22 of the another blade 20 adjacent to the lateral wall 20*b* of the one blade 20 on the concave surface side is located closer to the one blade 20 than the straight line PQ.

As shown in FIG. 3(*d*), the blade 20 is so formed that it has the height of $H_{01}$ on the side of its outer peripheral edge 21, the height increasing gradually toward the inner peripheral edge 22, and has the height of $H_{02}$ on the side of its inner peripheral edge 22.

As shown in FIG. 3, the fan 20 includes a fluid introducing channel (gap) 10*a* that will be formed between any two adjacent blades 20 when the fan 10 is actually operated. The fluid introducing channel 10*a* has the form that corresponds to the respective forms of the lateral wall 20*a* of the two adjacent blades 20, 20 on the convex surface side and the lateral wall 20*b* on the concave surface side.

It is also seen from FIG. 3(*d*) that the fluid introducing channel 10*a* has the form that corresponds to the respective forms of the large bend 32 on the first circular plate 30 and the small bend 42 on the second circular plate 40.

As shown in FIG. 3, the fluid introducing channel 10a is surrounded by the lateral wall 20a of one of the two adjacent blades 20 on the convex surface side, the lateral wall 20b of the other blade 20 on the concave surface side, and the inner side 30a of the first circular plate 30 and the inner side 40a of the second circular plate 40.

The first central opening portion 31 and the second central opening portion 41 are the outlet ports through which the fluid delivered from the fluid introducing channel 10a is expelled (or the inlet ports through which the fluid is delivered into the fluid introducing channel 10a).

(Structure of the Fan Manufacturing Apparatus)

Figure 9:
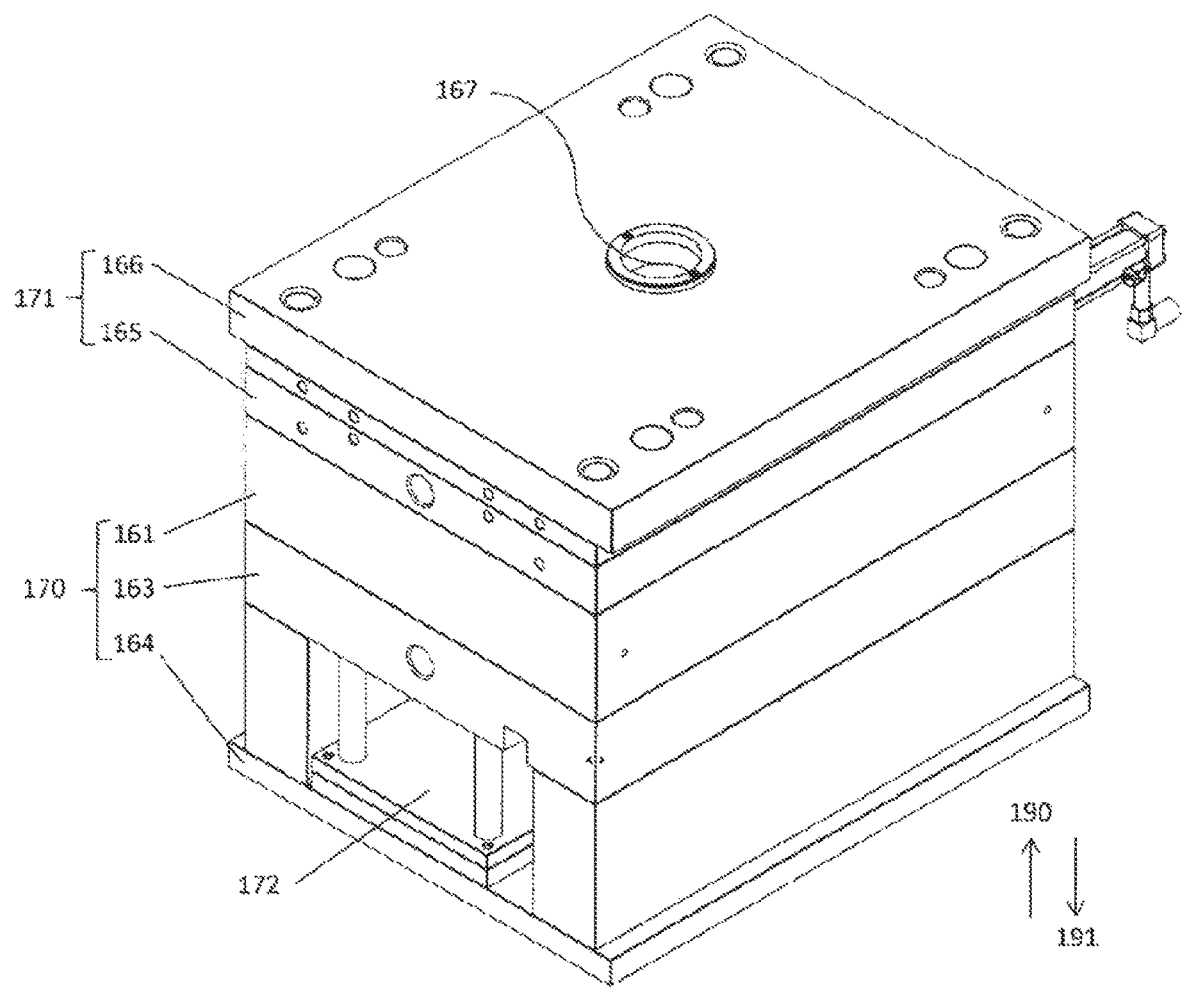
FIG. 9 represents the fan manufacturing apparatus in a perspective view and shows the state in which the primary forming mold and the secondary forming mold are closed.
Figure 13:
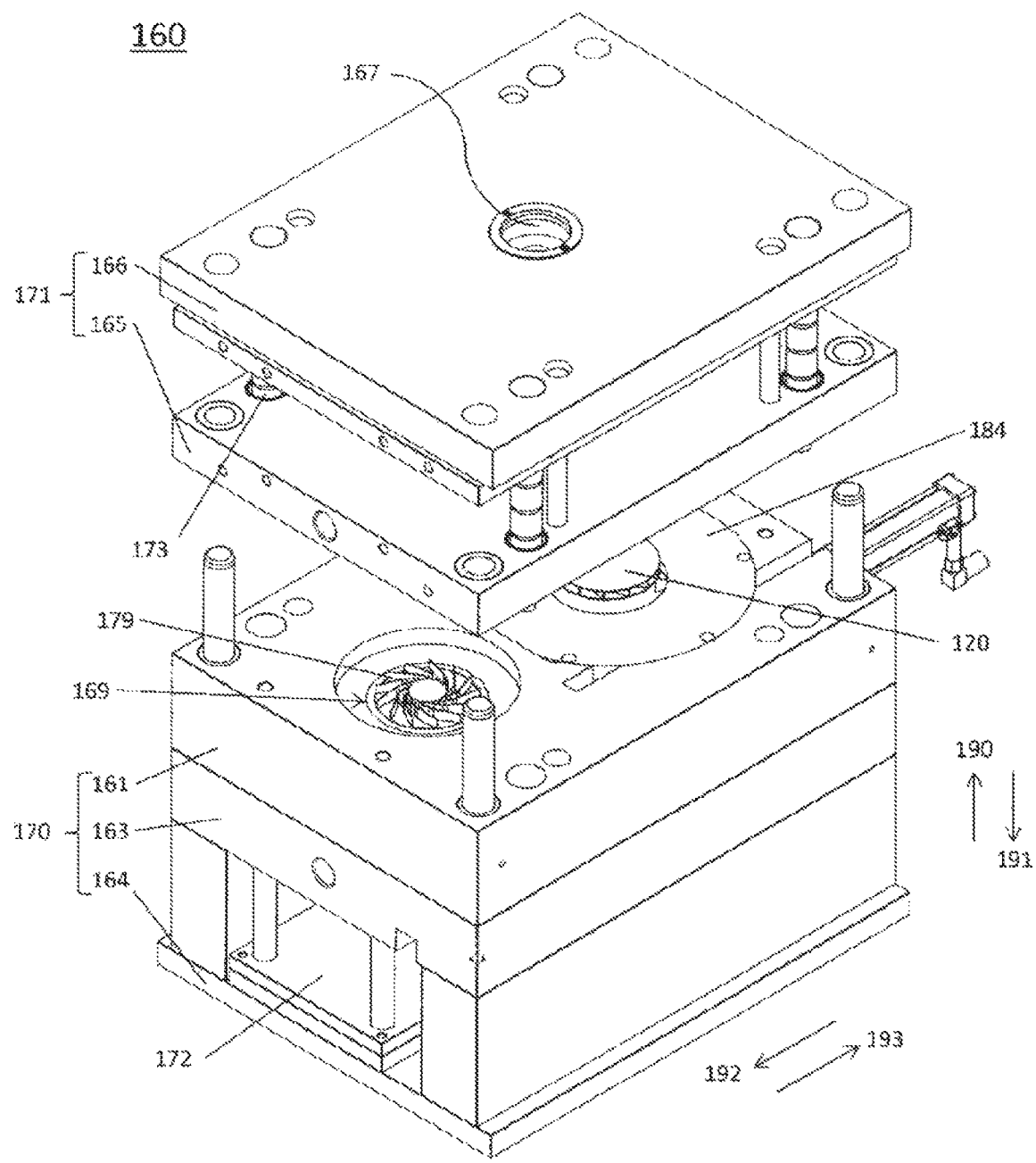
FIG. 13 is a perspective view that represents the fan manufacturing apparatus, showing the state in which the fan is removed after it has been completely molded.
Figure 17:
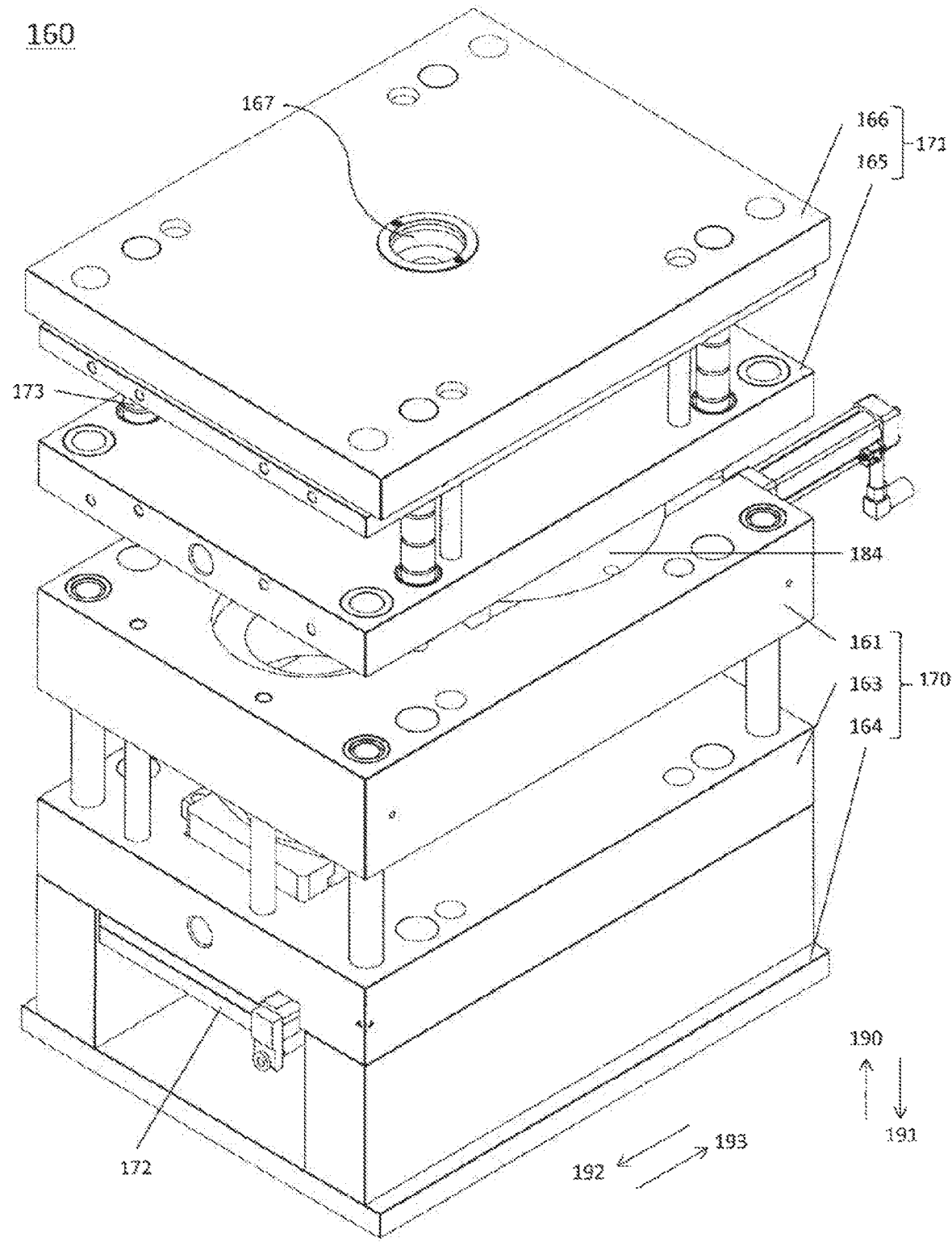
FIG. 17 is a perspective view illustrating the fan manufacturing apparatus, showing the state in which the composite molds have been interchanged between the primary molding side and the secondary molding side.

As shown in FIG. 9, FIG. 13 and FIG. 17, the fan manufacturing apparatus 160 in accordance with one embodiment of the present invention includes a first mold base 171 consisting of various molds and a second mold base 170 consisting of various molds, wherein the state in which the first mold base 171 and the second mold base 170 are opened (non-molding state) and the state in which they are closed (molding state) are repeated alternately between the molding state and the non-molding state so that the fan 120 shown in FIG. 2 and the semi-molded article 179 having the blades 130, 130 molded on the first circular plate 140 can be molded simultaneously by closing all the molds.

In this embodiment, it is assumed that the first mold base 171 represents the stationary-side mold base and the second mold base 170 represents the moving-side mold base. The molding state may be provided by bringing the moving-side mold base closer to the stationary-side mold base, and the non-molding state may be provided by bringing the moving-side mold base away from the stationary-sude mold base.

Figure 10:
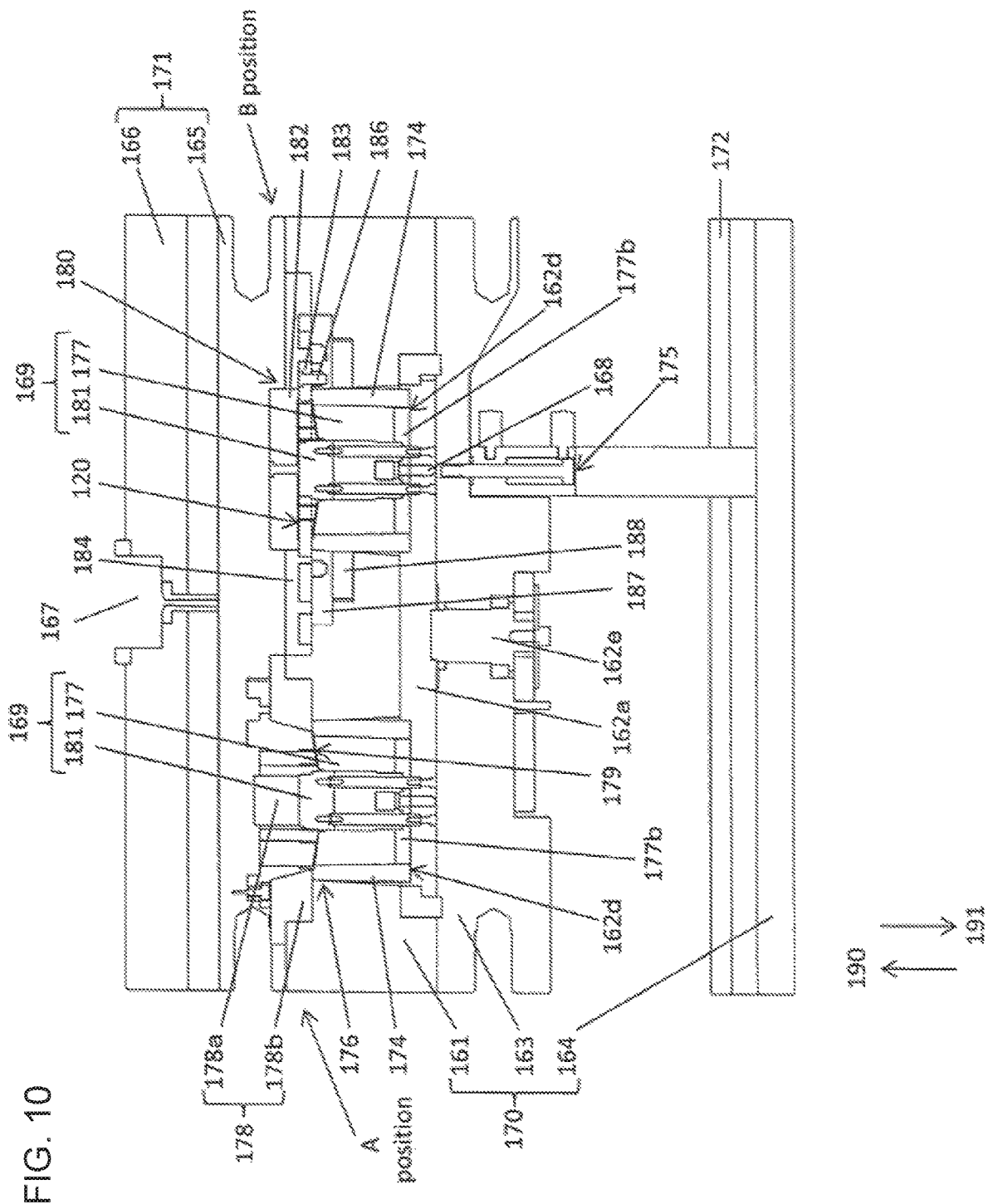
FIG. 10 is a longitudinal sectional view illustrating the fan manufacturing apparatus in FIG. 9 in which its lateral side is shown.
Figure 14:
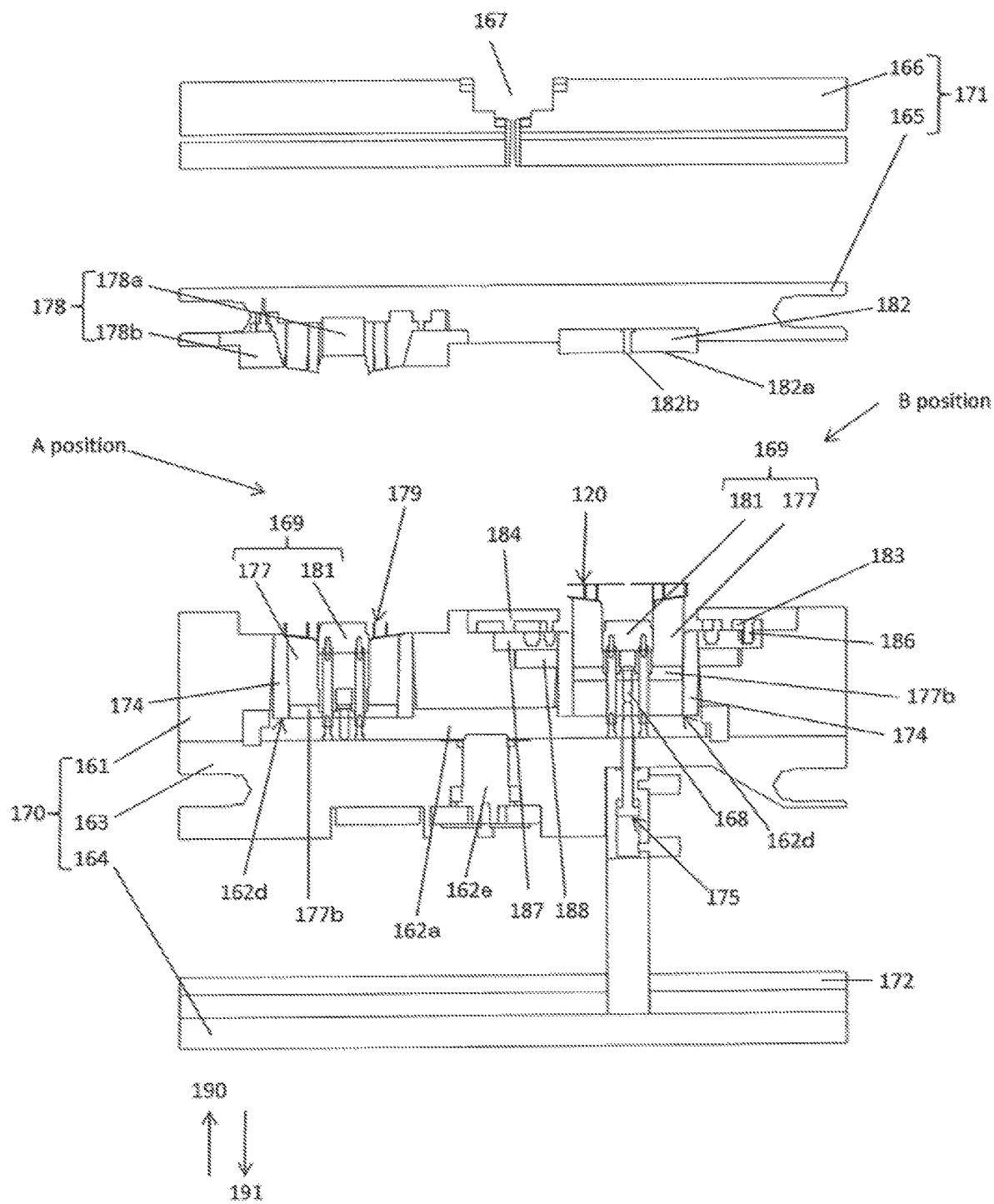
FIG. 14 is a longitudinal sectional view illustrating the fan manufacturing apparatus in FIG. 13 in which its lateral side is shown.
Figure 18:
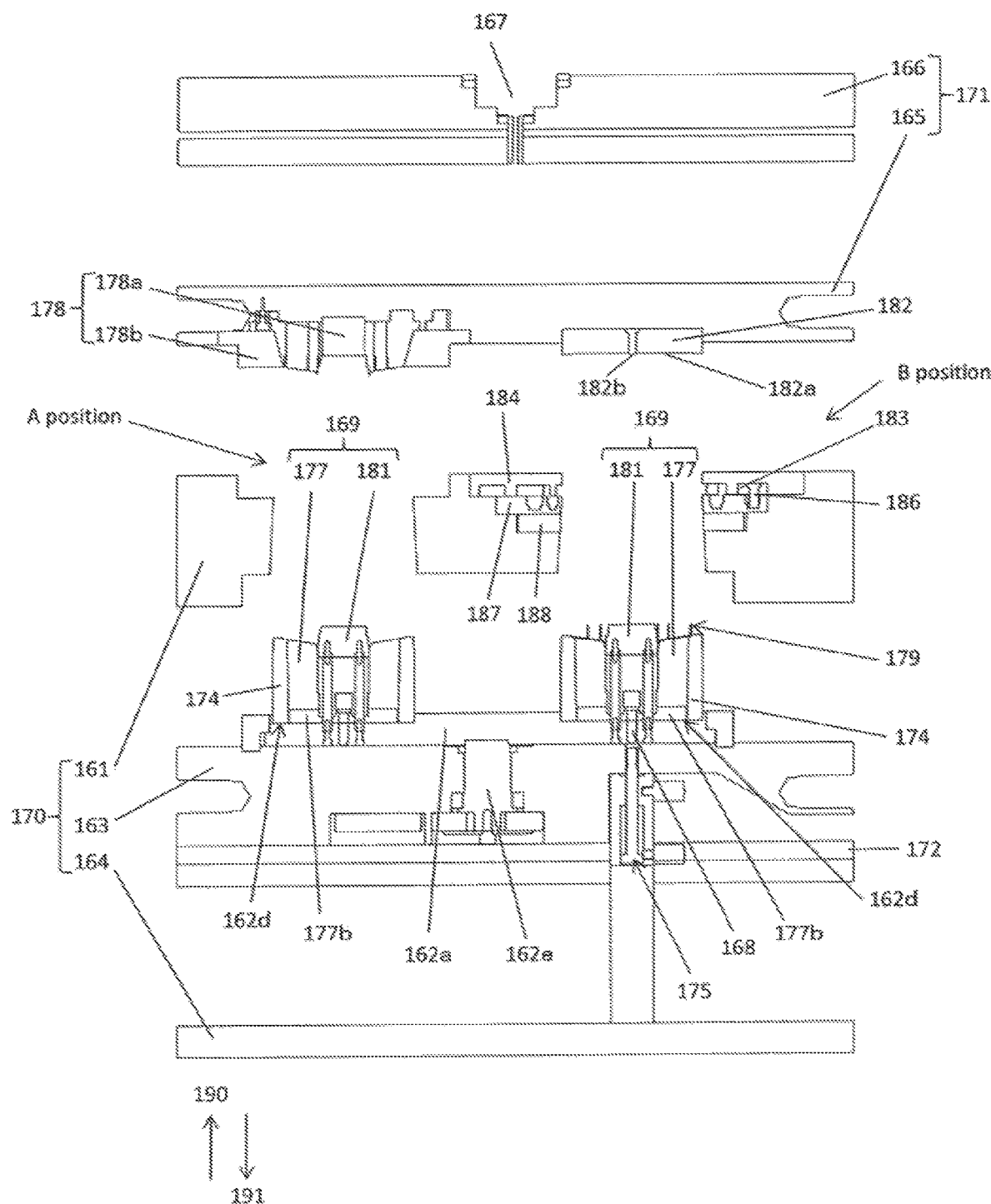
FIG. 18 is a longitudinal sectional view illustrating the fan manufacturing apparatus shown in FIG. 17 in which its lateral side is shown.

As shown in FIG. 10, FIG. 14 and FIG. 18, a blade forming mold 178 is provided on the primary molding side (A position) of the first mold base 171 (stationary-side mold base), and one composite mold 169 consisting of the first circular plate forming mold 177 and the first mold 181 is provided on the primary molding side (A position) of the corresponding second mold base 170 (moving-side mold base).

Similarly, the second mold 182 is provided on the secondary molding side (B position) of the first mold base 171 (stationary-side mold base), and the other composite mold 169 consisting of the first circular plate forming mold 177 and the first mold 181 and the third molds 183, 183 whose number is equal to the number of the blades 130 are provided on the second molding side (B position) of the corresponding second mold base (moving-side mold base).

Two composite molds 169, 169 are provided, each having the functions provided by combining the first circular plate forming mold 177 with the first mold 181, and those two composite molds can be moving alternately between the primary molding side (A position) and the secondary molding side (B position). In this way, the fan 120 is molded on the secondary molding side (B position) at the same time when the semi-molded article 179 is being molded on the primary molding side (A position).

The fan manufacturing apparatus 160 in accordance with this embodiment has the following structure:

1. Primary Forming Mold

Figure 11:
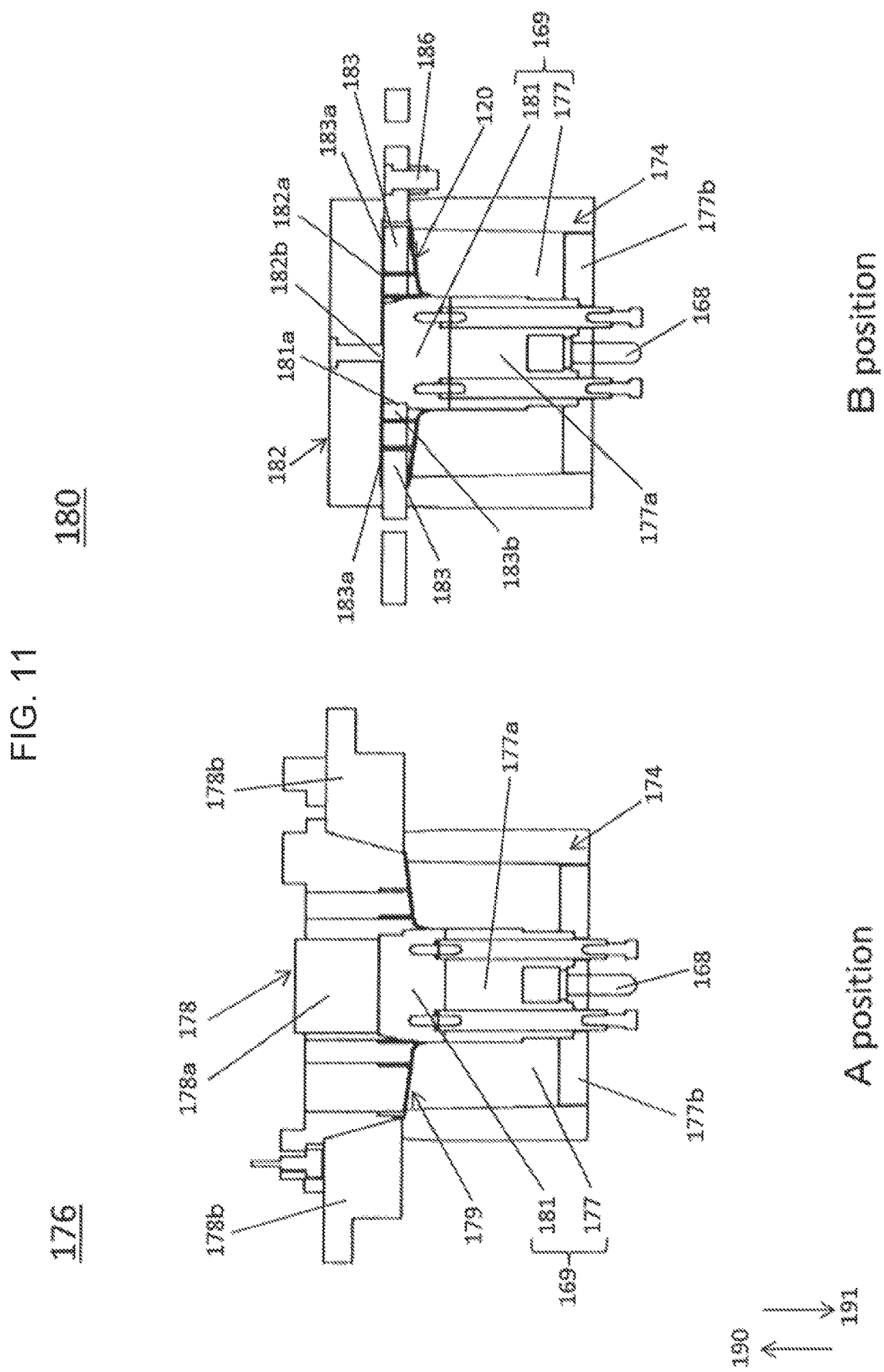
FIG. 11 represents the primary forming mold and the secondary forming mold shown on an enlarged scale in FIG. 10.
Figure 19:
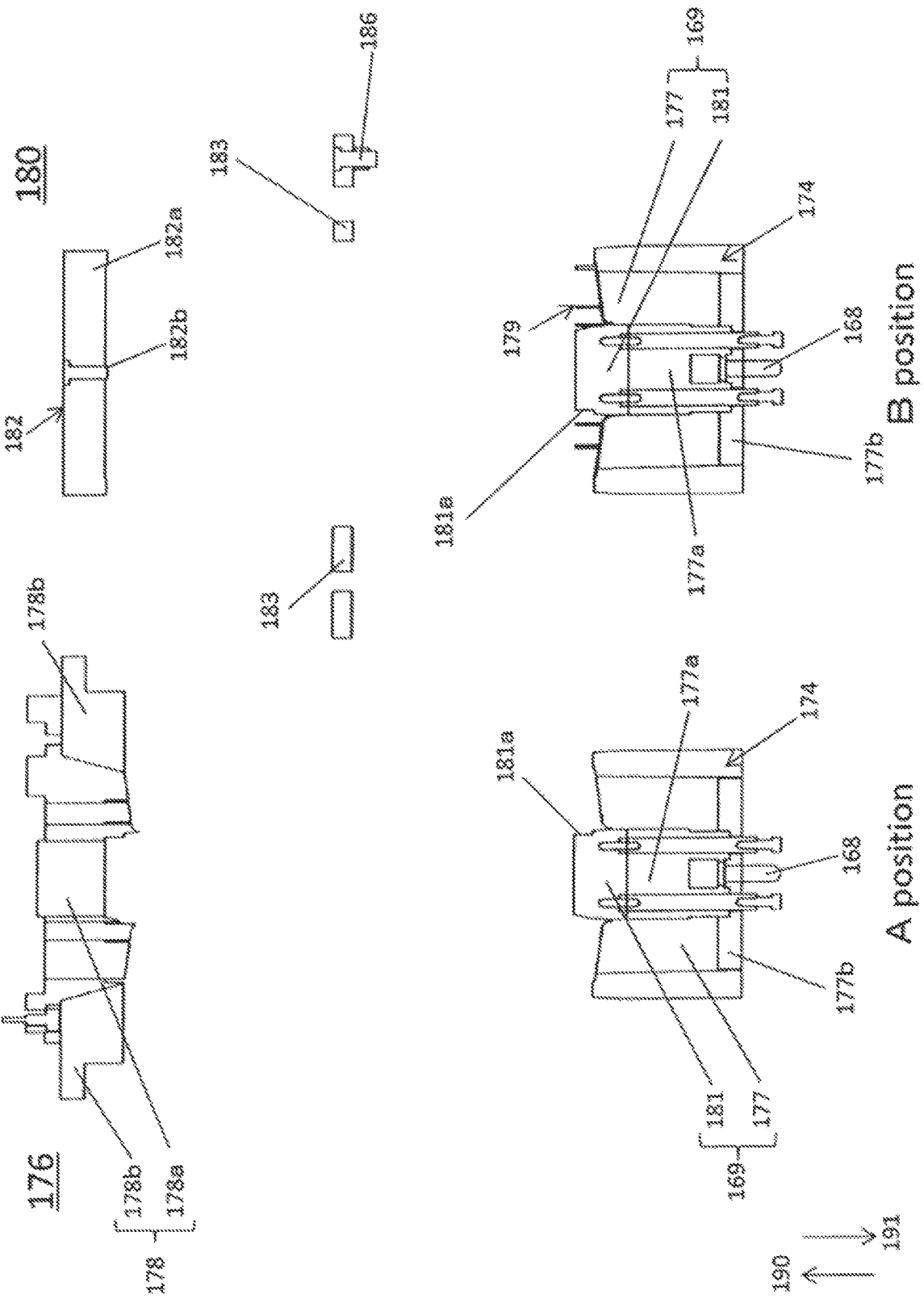
FIG. 19 represents the primary forming mold and the secondary forming mold shown on an enlarged scale in FIG. 18.

The primary forming mold is the mold intended for integrally molding the semi-molded article 179 so that it can include the first circular plate 140 and the blades 130 forming part of the fan 120 shown in FIG. 2. The primary forming mold 176 that is used by the fan manufacturing apparatus in accordance with this embodiment has the following structure:

(1) The Composite Mold for Molding the First Circular Plate and Used Commonly with the Secondary Forming Mold As shown in FIG. 11, FIG. 15 and FIG. 19, the composite mold 169 in this embodiment includes the first circular plate forming mold 177 for molding the outer side 140b, the outer peripheral edge 143 and the outer side of the large bend 142 on the first circular plate 140 and the first mold 181 for molding the first central opening portion 141 on the first circular plate 140 and that may also be used by the secondary forming mold.

As shown in FIG. 11, FIG. 15 and FIG. 19, the first circular plate forming mold 177 and the first mold 181 are disposed within the same molding frame 174. The molding frame 174 has a hollow cylindrical shape within which the first circular plate forming mold having the cylindrical shape with the closed bottom is placed.

Extending from the upper end side to the central side, a cylindrical recessed portion 177a having the size of the diameter of the first central opening portion 141 in the fan 120 to be molded is formed.

The first mold 181 that has the column shape is placed inside the cylindrical recessed portion 177a. The first mold 181 may be fixed to a concave molding frame receiver 162d formed on the molding frame fixing plate 162a to be described later.

It is seen from FIG. 10, FIG. 14 and FIG. 18, the first circular plate forming plate 177 is coupled with a bearing unit 168 that allows the bottom 177b of the mold to pass through the molding frame receiver 162d at right angles. In the B position, the bearing unit 168 can be moved in the direction in which the second mold base 170 is brought closer to the first mold base 171 or in the direction in which the second mold base 170 is brought away from the first mold base 171.

In the following description, the direction indicated by the arrow 190 will be referred to as the direction in which the mold is closed by bringing the second mold base 170 closer to the first mold base 171 and the direction indicated by the arrow 191 will be referred to as the direction in which the mold is opened by bringing the second mold base 170 away from the first mold base 171.

In the B position, the first circular plate forming mold 177 will move toward the directions indicated by the arrows 190, 191 while is sliding along the outer peripheral surface of the first mold 181 as the bearing unit 168 moves toward the directions indicated by the arrows 190, 191.

As the first circular plate forming mold 177 moves toward the direction indicated by the arrow 190, the first circular plate forming mold 177 holding the outer side 140b of the first circular plate 140 will push the fan 120 molded by the secondary forming mold 180 toward the direction indicated by the arrow 190 (the B position in FIG. 14 and FIG. 15). This operation will be described later.

After the first circular plate forming mold 177 has pushed the fan 120 toward the direction indicated by the arrow 190, it will move to the primary molding side (A position) that is the molding position in which the semi-molded article 179 is to be molded while it is sliding along the outer peripheral surface of the first mold 181 toward the direction indicated by the arrow 191. This operation will be described later.

By moving the bearing unit 168 toward its axial direction (the arrows 190, 191) as described above, on the primary molding side (A position), the first circular plate forming mold 177 will be able to take the molding position in which the semi-molded article 179 to be molded and on the secondary molding side (B position), it will be able to take the molding position and the removing position in which the fan 120 is to be molded and to be removed, respectively. This operation will be described later.

(2) The blade forming mold for molding the blades on the inner side of the first circular plate As shown in FIG. 11, FIG. 15 and FIG. 19, the blade forming mold in this embodiment is provided for molding the inner side of the large bend 142 so that the first central opening portion 141 on the first circular plate 140 can be located away from the inner side 150a of the second circular plate 150 on the inner peripheral side of the first circular plate 140.

It is seen from FIG. 11, FIG. 15 and FIG. 19 that the blade forming mold 178 and the first circular plate forming mold 177, the blade forming mold 178 and the first mold 181 can move to the first position (molding position) in which the semi-molded article 179 is to be molded by bringing them closer to each other or to the second position (non-molding position) by bringing them away from each other.

It is also seen from FIG. 11, FIG. 15 and FIG. 19 that the blade forming mold 178 is provided for molding the inner side 140a of the first circular plate 140 and for molding the blades 130 on the inner side 140a of the first circular plate 140. The blades 130 thus molded is so formed as to be bent and so that they can provide a convex surface in the direction of one complete revolution.

The blades 130 thus molded will have the form such that along the straight line PQ connecting between the center P of the fan 120 (the center P of both circular plates 140, 150, the center P of each blade 130) and the outer peripheral edge 131 of one blade 130, the neighborhood of the flat section 130c of another blade 130 (130A) adjoining the lateral wall 130b of the one blade 130 on the concave surface side is intersected by the neighborhood of the inner peripheral wall 132 of still another blade 130 (130B) adjoining the lateral wall 130b of the another blade 130 (130A) on the concave surface side (FIG. 2(a)).

The blades 130 will have the form so that they have the height of $H_{o1}$ on the side of the outer peripheral edge 131, the height increasing gradually toward the inner peripheral edge 132, and have the height of $H_{o2}$ on the side of the inner peripheral edge 132 (FIG. 2(d)).

It is seen from FIG. 11, FIG. 15 and FIG. 19 that the blade forming mold 178 includes an outer peripheral edge holding portion 178b for holding the outer peripheral edge of the semi-molded article 179 thus molded, that is, the outer peripheral edge 143 of the first circular plate 140 by means of the inner side of the large bend 142 formed such that the first central opening portion 141 of the first circular plate 140 is located away from the inner side 150a of the second circular plate 150 on the inner peripheral side of the first circular plate 140, the blade forming mold body 176a for molding the blades 130 on the inner side 140a of the first circular plate 140 and the first circular plate forming mold 177.

After the semi-molded article 179 has been molded by the primary forming mold 176 and then after the semi-molded article 179 has been retained within the composite mold 169 by holding the outer peripheral edge 143 of the first circular plate 140 between the blade forming mold body 178a and the first circular plate forming mold 177, the outer peripheral edge holding portion 178b will be moved away from the composite mold 169 at the later timing than the blade forming mold body 178, and will move to the second position (non-molding position).

Any suitable resin material is poured into the primary forming mold 176 having structure described above, and the semi-molded article 179 that contains the first circular plate 140 and the blades 130, 130 united together into one unit is then molded.

It should be noted, however, that the structure for the primary forming mold is not limited to the structure that has been described above, but it may be the structure that employs any type of the conventional various molds.

As one example of the structure and instead of the composite mold 169 having the first circular plate forming mold 177 and the first mold 181 placed separately from each other within the same molding frame 174, a single mold may be provided in which the first circular plate forming mold 177 and the first mold 181 are united together by integrally molding them although this structure is not shown.

2. Secondary Forming Mold

The secondary forming mold 180 is the mold for molding the fan 120 by molding the second circular plate 150 on the semi-molded article 179. The secondary forming mold 180 that may be used by the fan manufacturing apparatus in accordance with this embodiment has the following structure:

(1) First Mold

As shown in FIG. 11, FIG. 15 and FIG. 19, the first mold 181 in accordance with this embodiment includes a fitting recessed portion 181a on the outer circumference thereof that engages the fitting projecting portion 183b on the third mold 183.

(2) Second Mold

As shown in FIG. 11, FIG. 15 and FIG. 19, the second mold 182 in accordance with this embodiment includes an inner peripheral edge molding portion 182b for molding a second central opening portion 151 on the second circular plate 150 to be molded.

The second mold 182 further includes a second circulate plate molding portion 182a for molding the inner side 150b and outer peripheral edge 152 of the second circular plate 150 to be molded.

It is seen from FIG. 11, FIG. 15 and FIG. 19 that the second mold 182 and the first mold 181 can be moved to the first position (molding position) in which the fan 120 is to be molded from the semi-molded article 179 by being brought closer to each other and to the second position (non-molding position) by being brought away from each other.

(3) Third Mold

As shown in FIG. 4 to FIG. 6 and FIG. 11, the third mold 183 in accordance with this embodiment is provided so that it can be inserted into the corresponding gap formed between any two adjacent blades 130, 130 and can be disposed radially around the first mold 181, and includes an inner side molding portion 183a for molding the inner side 150a of the second circular plate 150 by engaging closely the lateral wall 130a of one blade 130 on the convex surface side and by engaging closely the lateral wall 130b of the other blade 130 on the concave surface side and which is placed in the above corresponding gap.

As shown in FIG. 11, the forward end of the third mold 183 on its inner peripheral side has a fitting projecting portion 183b that engages the corresponding fitting recessed portion 181a on the first mold 181.

When the third mold 183 is inserted into the corresponding gap formed between the two adjacent blades 130 as shown in FIG. 11, the inner side molding portion 183a will extend across the inner side 140a of the first circular plate 140 so that the fitting projecting portion 183*b* can be fitted into the corresponding fitting recessed portion 181*a* of the first mold 181.

Figure 4:
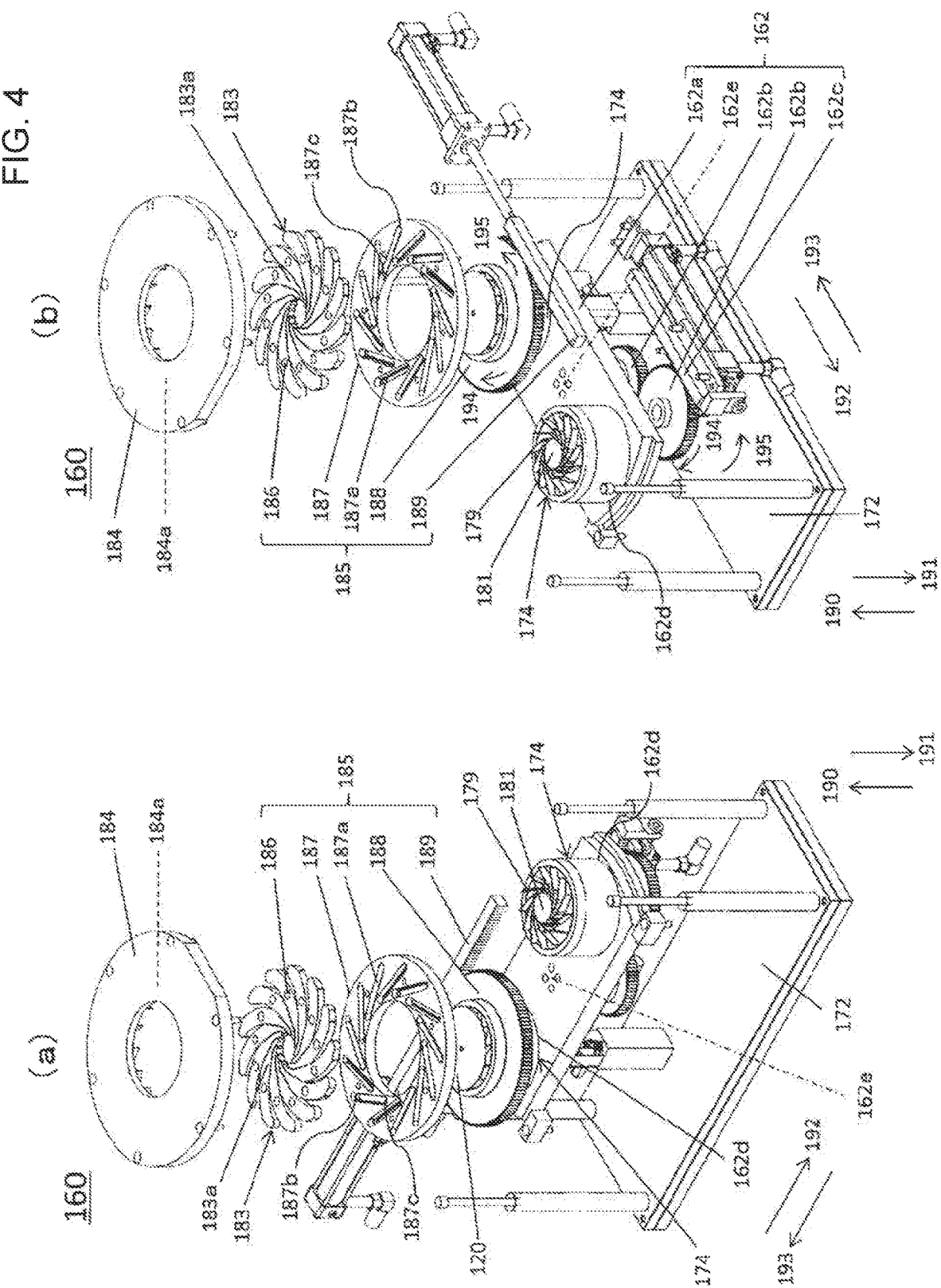
FIG. 4(a) represents an exploded perspective view of the fan manufacturing apparatus in accordance with one embodiment of the present invention although some parts are omitted and (b) represents the perspective view showing the opposite side of (a)
Figure 5:
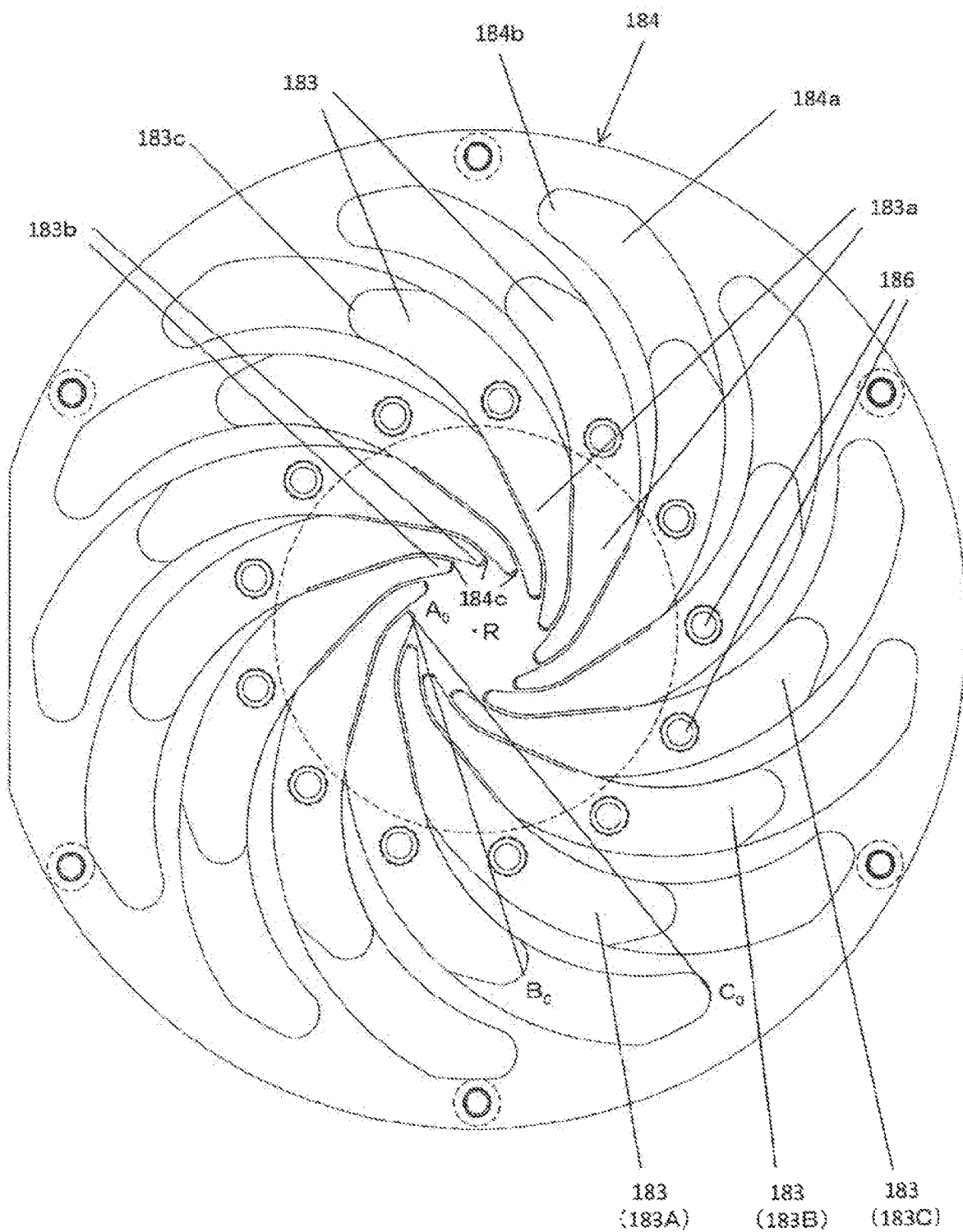
FIG. 5 represents one example of a third mold that is used in the secondary forming mold in accordance with one embodiment of the present invention.

As shown in FIG. 4 to FIG. 6, the third mold 183 will be accepted in the first sliding groove 184*a* formed obliquely and radially from the center R of a cover plate 184.

As shown in FIG. 10, FIG. 14 and FIG. 18, the cover plate 184 will be fixed to said secondary molding side (B position) of the first molding plate 161 that forms part of the second mold base 170.

Each of the third molds 183 whose number corresponds to the number of the blades 130 will close the mold by moving toward the center R simultaneously while it is rotating within the first molding plate 161 of the second mold base 170, and can be moving to the first position (molding position) on the centrifugal side arranged at equal interval around the circumference of the first mold 181. (FIG. 5, FIG. 6 and FIG. 12).

The third mold 183 can be moving to the second position (non-molding position) on the radial side located away from the center R by moving from the first position (molding position) while it is rotating (FIG. 6(*c*) and FIG. 16).

As shown in FIG. 5 and in the first position and along the straight line $A_0$ $B_0$ connecting between the inner peripheral side 184*c* of the first sliding groove 184*a* (the fitting projecting portion 183*b* on the third mold 183) and the rear end side 183*c* of one of the third molds 183, the neighborhood of the central portion of another third mold 183 (183A) adjoining the lateral wall of said one third mold 183 on the concave surface side (the lateral wall 130*b* of the blade 130 on the concave surface side) is intersected by the neighborhood of the fitting projecting portion 183*b* of still another third mold 183 (183B) adjoining the neighborhood of said central portion.

In said first position and along the straight line $A_0$ $C_0$ connecting between the inner peripheral side 184*c* of the first sliding groove 184*a* (the fitting projecting portion 183*b* of the third mold 183) and the outer peripheral side 184*b* of the first sliding groove 184*a* (the rear end side 183*c* of the third mold 183 in said second position), the rear end side 183 of the another third mold 183 (183A) adjoining the lateral wall of said one third mold 183 on the concave surface side (the lateral wall 130*b* of the blade 130), the neighborhood of the central portion of the still another third mold 183 (183B) adjoining said another third mold 183 (183A) and the neighborhood of the fitting projecting portion of further another third mold 183 (183C) adjoining said another third mold 183 (183B) intersect each other.

The third mold 183 in accordance with this embodiment may be used when the fan 120 shown in FIG. 2 is molded. It should be noted, however, that the number of the third molds may be modified so that it can correspond to the number of the blades in the fan 120 to be molded. If the fan 10 shown in FIG. 3 is to be molded, the third molds shown in FIG. 7 and FIG. 8 may be used. Each of the third molds 83 that are arranged radially around the circumference of the first mold 81 is inserted into the corresponding gap formed between the two adjacent blades 20, 20, and includes an inner side molding portion 83*a* for molding the inner side 40*a* of the second circular plate 40 by engaging closely the lateral wall 20*a* of one blade 20 on the convex surface side thereof and by engaging closely the lateral wall 20*b* of the other blade 20 on the concave surface side thereof. The forward end portion of the inner side molding portion 83*a* in the third mold 83 is formed like the fitting convex portion 83*b* that can be fitted into the fitting recessed portion 81*a* in the first mold 81 and is so inclined that it can be continued with the bend molding portion 81*b* in the first mold 81. When the third mold 83 is inserted into the corresponding gap between the two adjacent blades 20, 20 as desribed above, the inner side molding portion 83*a* will extend across the inner side of the large bend 32 to allow the fitting convex portion 83*b* to engage the fitting recessed portion 81*a* in the first mold 81.

Figure 7:
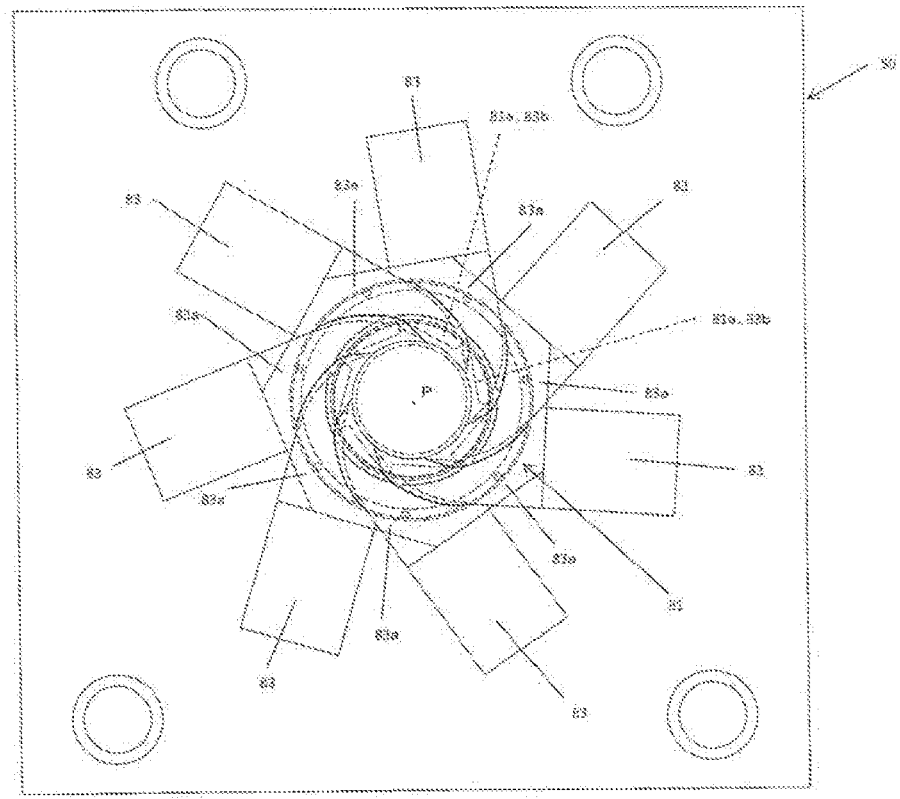
FIG. 7 represents another example of the third mold and shows the state in which the mold is closed.
Figure 8:
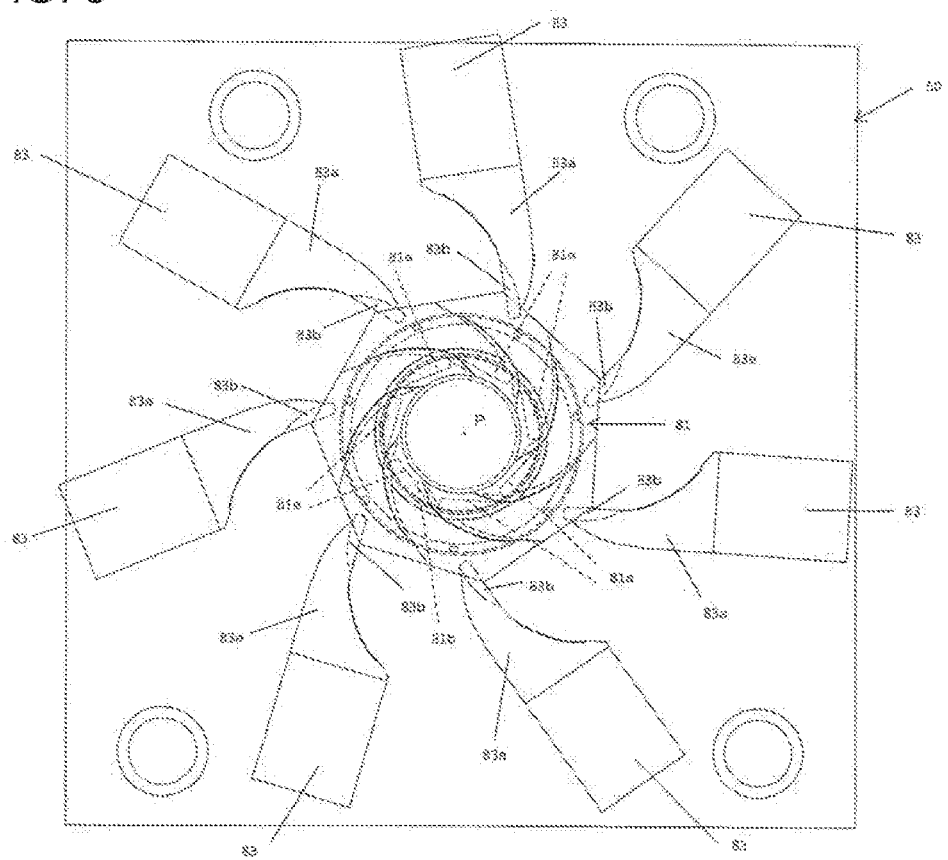
FIG. 8 shows the state in which the third mold in FIG. 7 is opened.

As shown in FIG. 7, each of the third molds 83 whose number corresponds to the number of the blades 20 can be moving along the mold base 50 toward the center P simultaneously (linear motion) and can be moving to the first position (molding position) on the centrifugal sides arranged at equal intervals around the circumference of the first mold 81. Each of the third molds 83 can also be moving from the above first portion to the second position (retreat position) on the radial side that is located away from the center P. It should be noted that the third molds 83 can be moving by following both the linear motion and the rotary motion.

3. Third Mold Opening/Closing Mechanism

The operation that allows the third mold 183 to be opened and closed by the movement of the third mold 183 to the first position and the second position as described above may be implemented by the opening/closing mechanism 185 that is structured as described below:

As shown in FIG. 4 to FIG. 6, the third mold 183 includes a bearing unit 186 extending toward the direction indicated by an arrow 191. The bearing unit 186 may engage the second sliding groove 187*a* that has the linear form and is formed obliquely and radially from the center of a doughnut-shaped rotary plate 187. The rotary plate 187 may be provided so that it can be coaxial with the center of the third mold 183 (the center R shown in FIG. 5). It is seen from FIG. 4 and FIG. 10 that the rotary plate 187 may be provided on the outer circumference of the molding frame 174 within which the composite mold 169 is placed, which will be described later.

The second sliding groove 187*a* is located on the outer circumference of the first circular plate forming mold 177 at the side of said secondary forming mold 180.

The bearing unit 186 engages the second sliding groove 187*a* smoothly, and may be guided to the outer peripheral side 187*b* or the inner peripheral side 187*c* of the second sliding groove 187*a*. In this embodiment, the bearing unit 186 is provided as a needle bearing.

As shown in FIG. 10, FIG. 14 and FIG. 18, the rotary plate 187 and a pinion 188 are provided on said secondary molding side (B position) of the first molding plate 161.

As shown in FIG. 4, the rotary plate 187 is driven by the combination of the pinion 188 and the rack 189 so that it can be rotated along the outer circumference of the molding frame 174 in the circumferential direction thereof.

The opening/closing mechanism acts on the third mold 183 so that it can move to the first position (molding position) on the centrifugal side and to the second position (non-molding position) on the radial side, this movement occurring alternately between the first position and the second position.

Specifically and in FIG. 4, as the rack 189 moves toward the direction indicated by the arrow 192, it causes the pinion 188 and the second sliding groove 187*a* to rotate toward the direction indicated by the arrow 194 and it also causes the second sliding groove 187*a* of the rotary plate 187 to rotate in the direction indicated by the arrow 194. The bearing unit 186 that is then located on the outer peripheral side 187*b* of the second sliding groove 187*a* shown in FIG. 6(*c*) and which is operatively linked with the rotation of the second sliding groove 187*a* will move to the inner peripheral side 187c shown I FIG. 6(a)) while it is engaging the second sliding groove 187a smoothly.

Then, the third mold 183, which is operatively linked with the movement of the bearing unit 186, will move from the outer peripheral side shown in FIG. 6(c) to the inner peripheral side 184c shown in FIG. 6 while it is sliding within the first sliding groove 184a on the cover plate 184, allowing the fitting projecting portion 183b to move to the inner peripheral side 184c of the first sliding groove 184a. The third mold 183 will then be located in the first position (molding position) on the above centrifugal side (FIG. 5 and FIG. 6 (a)).

As the rack 189 then moves toward the direction indicated by the arrow 193, it will cause the pinion 188 and the rotary plate 187 to rotate toward the direction indicated by the arrow 195, which will also cause the second sliding groove 187a on the rotary plate 187 to rotate toward the direction indicated by the arrow 195. Then, the bearing unit 186 located on the inner peripheral side 187c of the second sliding groove 187a shown in FIG. 6(a), which is operatively linked with the rotation of the second sliding groove 187a, will move to the outer peripheral side 187c shown in FIG. 6(c) while it is engaging the second sliding groove 187c smoothly.

The third mold 183, which is operatively linked with the movement of the bearing unit 186, will then move from the inner peripheral side 184c shown in FIG. 6(a) to the outer peripheral side 184b shown in FIG. 6(c) while it is sliding within the first sliding groove 184a so that the rear end side 183c can engage the outer peripheral side 184b of the first sliding groove 184a. At this time, the third mold 183 has been placed in the second position (non-molding position) on the radial side (FIG. 6(c)).

It should be understood that the mechanism for opening/closing the third mold is not limited to the structure described above, but it may be implemented by any type of the conventional various mechanisms. For the third mold 83, for example, its opening/closing mechanism may be implemented by the hydraulic cylinder, the air cylinder or the like (although this is not shown).

4. Composite Mold Moving Mechanism (1) As shown in FIG. 9, FIG. 13 and FIG. 17, the fan manufacturing apparatus 160 in accordance with this embodiment includes a second mold base 170 that consists of a first molding plate 161, a moving-side receiving plate 163 and a moving-side mounting plate 164.

The first molding plate 161 moves toward the direction indicated by arrows 190, 191 as a projecting plate 172, which is operatively linked with the first molding plate 161, moves toward the direction indicated by the arrows 190, 191 under the action of the hydraulic control.

Under the action of the hydraulic control, the moving-side receiving plate 163 moves toward the direction indicated by the arrows 190, 191 together with the moving-side mounting plate 164 along a guide groove (not shown) made of a coupling member and the like which are operatively linked with the second molding plate 165.

It is also seen from FIG. 9. FIG. 13 and FIG. 17 that the fan manufacturing apparatus 160 further includes a first mold base 171 that consists of a second molding plate 165 and a fixing-side mounting plate 166. The first mold base 171 is fixed to a molding material injecting device (not shown).

The second molding plate 165 and the moving-side receiving plate 163 are coupled with each other by means of a coupling member (not shown), and the second molding plate 165 is coupled with the fixing-side mounting plate 166 by means of a coupling member 173. The second molding plate 165 is placed under the action of the hydraulic control so that it can be moved by the length of the coupling member 173 toward the direction indicated by the arrows 190, 191.

As shown in FIG. 10, FIG. 14 and FIG. 18, the cover plate 184 is fixed on said second molding side (B position) of the first molding plate 161, on which side there are provided the third mold 183, the rotary plate 187 and the pinion 188 all placed within the first sliding groove 184a of the cover plate 184.

It is also seen from FIG. 10, FIG. 14 and FIG. 18 that on said primary molding side (A position) of the moving-side receiving plate 163, there is provided the composite mold 169 that is used by the primary forming mold 176 for molding the semi-molded article 179. On said secondary forming mold side (B position), the composite mold 169 that is used by the secondary forming mold 180 for molding the fan 120 from the semi-molded article 179.

As shown in FIG. 10, FIG. 14 and FIG. 18, the second molding plate 165 includes a blade forming mold 178 provided in the position facing opposite the composite mold 169 on the primary molding side (A position) of the moving-side receiving plate 163. It further includes the second mold 182 facing opposite the composite mold 169 in the secondary forming mold 180 provided on said secondary forming mold side (B position) of the moving-side receiving plate 163.

The fixing-side mounting plate 166 has a resin material injecting port 167 through which any suitable resin material is supplied by said forming material injecting device into the primary forming mold 176 and the secondary forming mold 180.

(2) As shown in FIG. 4, FIG. 10, FIG. 14 and FIG. 18, the moving-side receiving plate 163 further includes a rotating mechanism 162 consisting of a substantially rectangular shape fixing plate 162a, pinions 162b, 162b and a rack 162c.

The molding frame 174 may be fixed to a molding frame receiver 162d having the concave shape and formed on a molding frame fixing plate 162a shown in FIG. 10, FIG. 14 and FIG. 18. In this embodiment, two molding frame receivers 162d, 162d are provided, one of which is fixed to the molding frame 174 on the primary molding side (A position) and the other is fixed to the molding frame 174 on the secondary molding side (B position).

The molding frame fixing plate 162a can be rotated about the rotary shaft 162e toward the direction indicated by the arrow 194 or 195 by means of the combination of the pinions 162b, 162b and the rack 162c.

By using the rotating mechanism 162, the position of the composite mold 169 used by the primary forming mold 176 shown in FIG. 4 and the position of the composite mold 169 used by the secondary forming mold 180 can be interchanged alternately.

Specifically, as the rack 162c moves toward the direction indicated by the arrow 192, it will cause the molding frame fixing plate 162a to move toward the direction indicated by the arrow 195 by means of the pinions 162b, 162b, which will cause the molding frame 174 fixed to the one molding frame receiver 162c to move to the other molding frame 162d.

Then, the composite mold 169 in the primary forming mold 176 will move to the secondary forming mold side (B position) together with the semi-molded article 179. The composite mold 169 in the secondary forming mold 180 will also move to the primary molding side (A position) in its empty state, that is, from which the fan 120 has been removed.

As the rack 162c then moves toward the direction indicated by the arrow 193, it will cause the molding frame fixing plate 162c to rotate toward the direction indicated by the arrow 194 by means of the pinions 162b, 162b.

At this time, the composite mold 169 in the secondary forming mold 180 that has moved to the primary molding side (A position) will move to the secondary molding side (B position) together with the semi-molded article 179. The composite mold 168 in the primary forming mold 176 that has moved to the secondary molding side (B position) will also move to the primary molding side (A position) in its empty state, that is, from which the fan 120 has been removed.

5 Method for Molding Semi-Molded Article and Fan from the Semi-Molded Article

The fan manufacturing apparatus 160 in accordance with this embodiment is operated to repeat the steps that will be described below so that additional semi-molded articles 179 can be molded and additional fans 120 can be molded from the semi-molded articles 179 as molded by repeating the steps that will be described below:

(1) Molding Semi-Molded Articles and Molding Fans from the Semi-Molded Articles as Molded In FIG. 9 to FIG. 12, the third mold 183 is placed under the action of its opening/closing mechanism so that it can move to said first position (molding position) (FIG. 5(a)) in which it is inserted into the corresponding gap between the two adjacent blades on the semi-molded article 179. The third mold 183 will then be placed radially around the first mold 181, and the fitting projecting portion 183b on the third mold 183 will be fitted into the corresponding fitting recessed portion 181a on the first mold 181.

The second mold base 170 will move toward the direction indicated by the arrow 190 under the action of the hydraulic control as the moving-side receiving plate 163 moves toward the direction indicated by the arrow 190.

The second molding plate 165 on the first mold base 171 is then placed under the action of the hydraulic control so that it can be moved by the length of the coupling member 173 toward the direction indicated by the arrow 190, and the fan manufacturing apparatus 160 will be placed in its ready state for the resin injection.

At this time, the blade forming mold 178 and the second mold 182 have been set to said first position (molding position).

In the above state, any suitable resin material will be injected from said molding material injecting device to the molding material injecting port 167 on the fixing-side mounting plate 166. The resin thus injected will be supplied to the primary forming mold 176 and to the secondary forming mold 180.

(a) The primary molding side (A position): as shown in FIG. 9 to FIG. 12, the first circular plate 140 and the blades 130, 130 are integrally molded into one unit by the primary forming mold 176 so that the semi-molded article 179 containing them as integrally molded can be obtained.

The first circular plate forming mold 177 in the composite mold 169 is provided for molding the outer side 140c, the outer peripheral edge 143 and the outer side of the large bend 142 on the first circular plate 140.

The first mold 181 in the composite mold 169 is provided for molding the first central opening portion 141 on the first circular plate 140.

The blade forming mold 176 is provided for molding the inner side of the large bend 142 so that the first central opening portion 141 on the first circular plate 140 can be located away from the inner side 150a of the second circular plate 150 on the inner peripheral side of the first circular plate 140 and for molding the blades 130 on the inner side 140a of the first circular plate 140.

The semi-molded article 179 thus obtained is so formed as to be bent and that the blades 130 can have the convex surface in the direction of one complete revolution Along the straight line PQ connecting between the center P of each blade (the center P of both circular plates 140, 150 and the center P of each blade 130) and the outer peripheral edge 131 of one blade 130, the blades 130 thus molded have the form such that the neighborhood of the flat section 130c of another blade 130 (130A) adjoining the lateral wall 130b of the one blade 130 on the concave portion thereof is intersected by the neighborhood of the inner peripheral edge 132 of still another blade 130 (130B) adjoining the lateral wall 130b of the another blade 130 (130A) on the concave surface side thereof (FIG. 2(a)).

Furthermore, the blades 130 have the height of $H_{01}$ on the side of the outer peripheral edge 131 thereof, the height increasing gradually toward the inner peripheral edge 132, and have the height of $H_{02}$ on the side of the inner peripheral edge 132 thereof (FIG. 2(d)).

The first circular plate 140 has the first central opening portion 141 and the large bend 142 so formed as to be bent largely and that the first central opening portion 141 can be located away from the second circular plate 150 on the inner peripheral side thereof, each of the blades 130 leading to the large bend 142.

(b) The secondary molding side (B position): As shown in FIG. 9 to FIG. 12, the secondary forming mold 180 is intended for molding the fan 120.

The inner peripheral edge molding section 182b of the second mold 182 is provided for molding the second central opening portion 151 on the second circular plate 150.

The second circular plate molding section 182a of the second mold 182 is provided for molding the outer side 150 and the outer peripheral edge 152 on the second circular plate 150.

The inner side molding section 183 of the third mold 183 is provided for molding the inner side 150a on the second circular plate 150.

The resin fan 120 can be molded by joining the inner side 150a of the second circular plate 150 with the blades 130 (by the thermal fusion).

Following the primary molding process as described above, in this case, the composite mold 169 may be moved so quickly from the primary molding side (A position) to the secondary molding side (B position) that the blades 130 in the semi-molded article 179 can engage closely the inner side 150a of the second circular plate in the non-completely hardened state. The result is that they have been joined tightly just as they have been integrally molded.

(c) In the case in which the fan manufacturing apparatus 160 is operated first as described above, the resin will be poured into the primary forming mold 176 (that is, the blade forming mold 178 and the composite mold 169) so that only the semi-molded article 179 can be molded. In this case, the resin will not be poured into the primary forming mold 180 (that is, the second mold 182, the third mold 183 and the composite mold 169) and will be passed through a bypass path (not shown) through which that part of the resin which is in its hardened state will be discarded. At the time when the semi-molded article 179 has been completely molded, the bypass path on the side of the secondary forming mold 180 will be switched so that the resin can be placed in its ready state for the injection, and additional fans 120 will be molded continuously as described above in (b).

(2) Removal of the Fan as Completely Molded

As shown in FIG. 13 to FIG. 16, the second molding plate 165 in the first mold base 171, which is now placed in the state shown in FIG. 9 to FIG. 12, will be placed under the action of the hydraulic control so that it can be moved by the length of the coupling member 173 toward the direction indicated by the arrow 191.

Under the action of the hydraulic control, the second mold base 170 will be moved toward the direction indicated by the arrow 191 as the moving-side receiving plate 163 moves toward the direction indicated by the arrow 191.

(a) Primary Molding Side (A position): as shown in FIG. 13 to FIG. 15, the outer peripheral edge holding portion 178b is provided for holding securely the outer peripheral edge 143 of the first circular plate 140 for the semi-molded article 179 by cooperating with the first circular plate forming mold 177 so that the semi-molded article 179 can be retained in the composite mold 178 (the first circular plate forming mold 177). The composite mold 169 will be moved away from the blade forming mold body 178 and the outer peripheral edge holding portion 178b in that sequence. This will permit the semi-molded article 179 to rest on the composite mold 169 (the first circular plate forming mold 177), and therefore it will not remain in the blade forming mold 178a.

(b) Secondary Molding Side (B position): As shown in FIG. 13 to FIG. 15, the second mold 182 moves from said first position (molding position) to said second position (retreat position) and is moved away from the first mold 181.

Under the action of the opening/closing mechanism, the third mold 183 moves from said first position (molding position) to said second position (retreat position) and is moved away from the first mold 181.

In addition to the molding frame fixing plate 162a described above, the moving-side receiving plate 163 further includes a bearing unit pushing device 175 that causes the bearing unit 168 to move toward the direction indicated by the arrow 190.

The bearing unit pushing device 175 pushes the bearing unit 168 toward the direction indicated by the arrow 190 so that it can be moved toward the direction indicated by the arrow 190.

As the bearing unit 168 is moving toward the direction indicated by the arrow 190, the first circular plate forming mold 177 moves toward the direction indicated by the arrow 190 (FIG. 14 and FIG. 15).

When the first circular plate forming mold 177 moves toward the direction indicated by the arrow 190, the first circular plate forming mold 177 within which the outer side of the first circular plate 140 is retained will push the fan 120 toward the direction indicated by the arrow 190. The fan 160 thus pushed will be dropped toward the direction indicated by an arrow 192 and will be stored.

(3) Movement of Composite Mold

It is seen from FIG. 17 to FIG. 20 that under the action of the hydraulic control, the first molding plate 161 in the second mold base 170 will be moved by the height of the molding frame 174 from the state shown in FIG. 13 to FIG. 16 toward the direction indicated by the arrow 190 (FIG. 17 and FIG. 18).

The molding frame fixing plate 162a, which is provided in the moving-side fixing plate 163, will be placed under the action of the rotating mechanism 162 so that it can be rotated around the rotary shaft 162c toward the direction indicated by the arrow 194 or 195.

When the molding frame fixing plate 162a is rotated toward the direction indicated by the arrow 194 or 195, the composite mold 169 on the primary forming mold 176 in which the semi-molded article 179 has been molded will move toward the secondary molding side (B position) with the semi-molded article 179 resting on the composite mold 169 (FIG. 18 and FIG. 19). The composite mold 169 on the secondary forming mold 180 from which the fan 160 has been removed will move toward the primary molding side (A position) as it is placed in its empty state (FIG. 18 and FIG. 19).

The first circular plate forming mold 177 in the composite mold 169 that has moved to the primary molding side (A position) will move toward the direction indicated by the arrow 191 (FIG. 18 and FIG. 19).

The first molding plate 161 on the second mold base 170 will be moved by the height of the molding frame 174 toward the direction indicated by the arrow 191.

The respective composite molds 169 for the primary forming mold 176 and the secondary forming mold 180 will take the positions in which the semi-molded article is to be molded and the fan is to be molded as shown in FIG. 9. Following the above operation, the fan manufacturing apparatus 160 is then operated so that the semi-molded articles 179 can be molded and that the fans 120 can be molded from the semi-molded articles 179 as molded by repeating the steps (1) to (3) described above.

(5) The fan manufacturing apparatus 160 in accordance with this embodiment is capable of molding the resin fans that are well suited to the fluid transport and have the form in which the first circular plate is so formed as to be bent largely at the central opening portion and that the central opening portion in the first circular plate is located away from the inner side of the second circular plate on the inner peripheral side of the first circular plate, the form being provided such that the height between the first circular plate and the second circular plate in the inner peripheral edge (the height $H_{02}$ of the blade 130 on the side of the inner peripheral edge thereof) is greater than the height between the first circular plate and the second circular plate in the outer peripheral edge (the height $H_{01}$ of the blade 130 on the side of the outer peripheral edge 131 thereof).

(6) By using the third mold 183 and its opening/closing mechanism 185, in particular, the fan manufacturing apparatus that includes the primary forming mold and the secondary forming mold arranged in the compact form therein can be designed to meet the needs of compacting the structure as described above, and the fan that includes the particular number of blades 130 (thirteen (13) blades as shown in FIG. 2, for example) can be molded easily as opposed to the conventional fan manufacturing apparatus for which it was difficult to manufacture the fan having such number of blades as mentioned above.

(7) In this embodiment, however, it should be noted that the composite mold 169 for the primary forming mold 176 and the composite mold 169 for the secondary forming mold 180 can be interchanged by using the rotating mechanism 162. Preferably, this rotating mechanism 162 should be rotated alternately toward the direction indicated by the arrows 194 and 195, but it may be rotated in one direction by causing the molding frame fixing plate 162a to rotate toward the direction indicated by the arrow 194, for example (although this is not shown).

Instead of the rotating mechanism 162, a slide mechanism may also be used to move the composite molds 169 in parallel toward the primary molding side (A position) and to the secondary molding side (B position), respectively (although this is not shown).

(8) In this embodiment, it has been described that the fan manufacturing apparatus 160 can be operated so that the semi-molded article 169 can be molded and the fan 120 can be molded from the semi-molded article 179 thus molded, both of those molding operations occurring repeatedly and simultaneously.

Instead of the composite molds 169, a single mold also may be used, in which case the first circular plate forming mold and the first mold described above can be integrally molded into one unit so that the semi-molded articles and fans can be molded by following the steps that will be described below.

(a) The semi-molded article is molded by the blade forming mold and the single mold described above on the primary molding side (A position);

(b) The semi-molded article thus molded is removed from the primary forming mold. As soon as the semi-molded article has been removed, it is moved to the secondary molding side (B position) where it is inserted into the first mold in the secondary forming mold;

(c) Each of the third molds is inserted into the corresponding gap formed by the two adjacent blades on the semi-molded article by using the opening/closing mechanism described above or any conventional opening/closing mechanism, and the first mold, the second mold and the third mold are used to integrally mold the semi-molded article and the first circular plate. The fan is thus completely molded; and (d) The fan thus molded is removed from the primary forming mold, and the semi-molded article is molded by following the above step (a).

(9) The fan manufacturing apparatus in accordance with the various embodiments of the present invention that have been described so far can mold the resin fan that is well suited to the fluid transport wherein the fan has the form in which the first circular plate has the large bend so formed as to be bent largely on the central opening portion and the central opening portion on the first circular plate is located away from the inner side of the second circular plate on the inner peripheral side of the first circular plate and in which the height between the first circular plate and the second circular plate in the inner peripheral edge of the first circular plate (which is the height $H_{02}$ of the blade on the side of the inner peripheral edge thereof) is greater than the height between the first circular plate and the second circular plate in the outer peripheral edge (which is the height $H_{01}$ of the blade on the side of the outer peripheral edge thereof).

DESCRIPTION OF REFERENCE NUMERALS

The following is a list of the reference numerals referred to in the specification:
10, 120 fan
20, 130 blade
21, 131 outer peripheral edge of the blade
22, 132 inner peripheral edge of the blade
30, 140 first circular plate
30a, 140a inner side of the first circular plate
30b, 140b outer side of the first circular plate
31, 141 first central opening portion
32, 142 large bend
33, 143 outer peripheral edge of the first circular plate
40, 150 second circular plate
40a, 150a inner side of the second circular plate
40b, 150b outer side of the second circular plate
41, 151 second central opening portion
43, 152 outer peripheral edge of the second circular plate
160 fan manufacturing apparatus
162 rotating mechanism
169 composite mold
176 primary forming mold
177 first circular plate forming mold
177a recessed portion
178 blade forming mold
179 semi-molded article
180 secondary forming mold
81, 181 first mold
81a, 181a fitting recessed portion
182 second mold
182a second circular plate molding section
182b inner peripheral edge molding section
83, 183 third mold
83a, 183a inner side molding section
83b, 183b fitting projecting portion
184a first sliding groove
185 opening/closing means
186 bearing unit
187 rotary plate
187a second sliding groove

The invention claimed is:

1. A method of manufacturing a resin fan that includes a multitude of blades arranged radially from a center of the fan and held securely between a first circular plate and a second circular plate aligned at the center of the fan with each other, said resin fan includes a particular shape wherein:

(a) said blades are bent at a bend, and the bend has a convex surface;

(b) each of said blades is molded such that it has a height of $H_{01}$ on an outer peripheral edge thereof, said height increasing gradually toward an inner peripheral edge, and that each of said blades has a height of $H_{02}$ ($>H_{01}$) on an inner peripheral edge thereof; and (c) said first circular plate includes a first central opening portion;

a primary forming mold includes:

(a) a first circular plate forming mold for molding an outer side and an outer peripheral edge of said first circular plate;

(b) a first mold for molding the first central opening portion of said first circular plate;

(c) a blade forming mold for molding said blades on an inner side of said first circular plate, in which (d) said blade forming mold, said first circular plate forming mold, and said first mold can be moved to a molding position in which a semi-molded article including said first circular plate and said blades is molded by being brought closer to each other and to a non-molding position by being brought away from each other;

a secondary forming mold includes:

(a) said first mold;

(b) a second mold for molding an outer side and an outer peripheral edge of said second circular plate;

(c) a third mold for molding an inner side of said second circular plate by being inserted into a corresponding gap formed between any two of the multitude of blades that are adjacent to each other and disposed radially in close proximity of a circumference of said first mold such that it can engage closely a lateral wall of one blade located in said corresponding gap and that it can engage a lateral wall of another of the multitude of blades located in said corresponding gap;

(d) said second mold and said first mold can be moved to a molding position in which said fan is to be molded from said semi-molded article by being brought closer to each other and to a non-molding position by being brought away from each other; and (e) said third mold can be moved to a first position in which it is located on a centrifugal side by being brought closer to said first mold and to a second position in which it is brought away from said first mold toward a radial side, said third mold placed in said first position being inserted into the corresponding gap formed between said two blades adjacent to each other so that the inner side of said second circulate plate can be molded;

the method comprising:

(a) closing said blade forming mold, said first simulate circular plate forming mold and said first mold so that they can be moved from said non-molding position to the molding position in which said semi-molded article is to be molded, and any suitable resin material is poured into said blade forming mold, said first circular plate forming mold and said first mold for molding said semi-molded article during the primary molding stage;

(b) moving said semi-molded article from said primary forming mold to said first mold that forms part of said secondary forming mold;

(c) in said first position, inserting said third mold into each corresponding one of the gaps formed between any two adjacent blades of said semi-molded article; in the molding position in which said fan is to be molded, said second mold and said first mold are closed; and during the secondary molding stage, any suitable resin material is poured into said first mold, said second mold and said third mold so that said fan can be molded by integrally molding said second circular plate and said semi-molded article, and (d) opening said second mold and said first mold so that the molding position in which said fan has been completely molded can be moved to the non-molding position and that in said second position, said third mold can be brought away from said first mold and said fan as completely molded is then removed.

2. The method of manufacturing a resin fan as defined in claim 1, wherein the method further includes the steps described below:

(1) said resin fan is molded into a particular shape in the following way in which (d) a notional straight line connecting between an end of an outer peripheral side of any one blade of said multiple blades and an axis passing through a center of each of the circular plates insects another blade adjacent to said blades any one blade;

(e) said first circular plate includes a large bend to be so formed as to be bent largely and that said first central opening portion is located away from said second circular plate on the inner peripheral side of said first circular plate, each of said blades leading to said large bend; and (f) said second circular plate includes a second central opening portion;

(2) said primary forming mold includes:

(e) said first circular plate forming mold for molding the large bend on said first circular plate;

(3) said secondary forming mold includes:

(f) said second mold for molding said second central opening portion.

3. The method of manufacturing a resin fan as defined in claim 2, wherein the method further includes the steps described below:

(1) said resin fan is molded in the form such that the straight line connecting between the end of the outer peripheral side of said any one blade and the axis passing through a center of each of the circular plates intersects said any one blade of said multitude of blades, another blade adjacent to said any one blade and intersects still another blade adjacent to said another blade;

(2) said third mold further has the following structure in which (a) along the straight line connecting between the forward end of the inner peripheral side of said any one third mold and the rearward end of the outer peripheral side thereof, said third mold, which is located in said first position, is intersected by the neighborhood of the central portion of another third mold adjacent to any one third mold; and (b) along the straight line connecting between the forward end of the inner peripheral side of said any one third mold and the rearward end of the outer peripheral side of said third mold located in said second position, said third mold, which is located in said first position, is structured such that the rearward end of the outer peripheral side of another third mold adjacent to any one third mold, the neighborhood of the central portion of still another third mold adjacent to said another third mold and the neighborhood of the forward end of further another third mold adjacent to said still another third mold are provided so that they can intersect each other.

4. The method of manufacturing a resin fan as defined in claim 3, wherein the method further includes the steps described below:

(1) a composite mold is provided, said composite mold having the functions provided by combining said first circular plate forming mold with said first mold; and (2) additional semi-molded articles and additional fans are molded by repeating the steps of the following procedure in which (a) said blade forming mold and said composite mold are closed so that they can be moved from said non-molding position to the molding position in which said semi-molded article is to be molded, and during the primary molding stage, any suitable resin material is poured into said blade forming mold, said first circular plate forming mold that forms part of said composite mold and said first mold so that said semi-molded article including the first circular plate and blades can be molded;

(b) said blade forming mold and said composite mold are opened to allow said non-molding position to be provided, and with said semi-molded article resting on said composite mold, said composite mold is moved to the respective positions that correspond to said second mold and said third mold;

(c) said third mold is inserted into each corresponding one of the gaps formed between any two adjacent blades of said semi-molded article so that said first position can be provided and said second mold and said composite mold are closed to allow said molding position to be provided, and on the secondary molding stage, any suitable resin material is poured into said second mold, said third mold and said first mold that forms part of said composite mold so that said fan can be completely molded by uniting said second circular plate with said semi-molded article;

(d) said second mold and said composite mold are opened to allow them to be moved from the molding position in which said fan has been completely molded to said non-molding position and to allow said second position to be provided by bringing said third mold away from said first mold, and said completely molded fan is removed from said second position; and (e) said composite mold from which said completely molded fan has been removed is moved to the position that corresponds to said blade forming mold, and additional semi-molded articles are molded in the manner described in the preceding (a).

5. The method for manufacturing a resin fan as defined in claim 4, wherein the method further includes the steps described below:

(1) a composite mold is structured as follows:

(a) extending from the upper end side toward the center side of said first circular plate forming mold, it includes a recessed portion that is so formed as to be equal to the size of the diameter of said first central opening portion on said first circular plate;

(b) said first mold is fitted into said recessed portion on said first circular plate forming mold; and (c) said first circular plate forming mold can be moved toward the direction in which it is brought closer to said second mold or toward the direction in which it is brought away from said second mold along an outer peripheral surface of said first mold;

(2) two of said composite molds are provided, one composite mold and said blade forming mold providing the primary molding stage during which said semi-molded article is to be molded, and simultaneously with said primary molding stage or earlier or later than said primary molding stage, the other composite mold with the semi-molded article resting thereon, said second mold and said third mold providing the secondary molding stage during which said fan is to be molded;

(3) all of the molds are opened to allow said other composite mold from which said fan has been removed to be moved to the position in which said one composite mold is located and to allow said one composite mold with said semi-molded article resting thereon to be moved to the position in which said other composite mold is located; and (4) additional semi-molded articles and additional fans are molded in the manner described in the preceding (2).

6. An apparatus for manufacturing a resin fan that includes a multitude of blades arranged radially from center of the fan and held securely between a first circular plate and a second circular plate aligned at the center of the fan with each other, said resin fan being molded on a two-stage molding process including a primary forming mold and a secondary forming mold, wherein (1) said resin fan is molded into a particular shape in the following way in which (a) said blades are bent at a bend and the bend has a convex surface;

(b) each of said blades is molded such that it has a height of $H_{o1}$ on an outer peripheral edge thereof, said height increasing gradually toward an inner peripheral edge and that each of said blades has a height of $H_{o2}$ that is greater than $H_{o1}$ on the inner peripheral edge thereof; and (c) said first circular plate includes a first central opening portion; and (2) with each of the molds being closed, said primary forming mold is the mold on which a semi-molded article including said first circular plate and said blades united together into one unit is to be molded, the apparatus comprises:

(a) a first circular plate forming mold for molding an outer side and an outer peripheral edge of said first circular plate;

(b) a first mold for molding the first central opening portion of said first circular plate;

(c) a blade forming mold for molding said blades on an inner side of said first circular plate; and further includes:

(d) means for moving said blade forming mold, said first circular plate forming mold, and said first mold to a molding position in which said semi-molded article is to be molded by being brought closer to each other and to a non-molding position by being brought away from each other;

(3) with all of the molds being closed, said secondary forming mold is the mold on which said resin fan is to be molded by uniting said semi-molded article and said second circular plate together, and includes the molds described below:

(a) said first mold;

(b) a second mold for molding an outer side and an outer peripheral edge of said second circular plate;

(c) a third mold for molding an inner side of said second circular plate by being inserted into a corresponding gap formed between any two of the multitude of blades that are adjacent to each other and disposed radially in close proximity of a circumference of said first mold so that said third mold can engage closely a lateral wall of one blade located in said corresponding gap and that said third mold can engage a lateral wall of another of the multitude of blades located in said corresponding gap;

(d) means is provided for moving said second mold and said first mold to a molding position in which said fan is to be molded from said semi-molded article by bringing those two molds closer to each other and for moving said second mold and said first mold to a non-molding position by bringing those two molds away from each other;

(e) means is provided for opening and closing said third mold so that said third mold can be moved to a first position located on a centrifugal side by being brought closer to said first mold and that said third mold can be moved to a second position located radially away from said first mold, said third mold having the structure in which in said first position, said third mold is inserted into the corresponding gap formed between said any two adjacent blades so that it can mold the inner side of said second circular plate;

(f) said first mold has a recessed portion that engages the forward end of said third mold by being fitted into said forward end; and (g) said third mold is inserted into said corresponding gap and has a projecting portion that allows it to engage said first mold by allowing its forward end to be fitted into said recessed portion on said first mold; and (4) two composite molds are provided, each of said composite molds having the functions provided by combining said first circular plate forming mold with said first mold, and means is provided for allowing each composite mold to move to the position that corresponds to said blade forming mold and to the position that corresponds to said second mold, the movement of each composite mold occurring alternately between those two positions.

7. The apparatus for manufacturing a resin fan as defined in claim 6, wherein said means for opening and closing the third mold further includes:
   (a) a rotary plate, said rotary plate having a plurality of second linearly sliding grooves formed obliquely and radially from the center of rotation, said second linearly sliding grooves being located on an outer circumference of said first circular plate forming mold at the side of said secondary forming mold;
   (b) said rotary plate being provided so that it can be coaxial with the center of said third mold; and
   (c) a bearing unit, said bearing unit being inserted into said second linearly sliding grooves and coupled with said third mold;
   (d) said rotary plate being rotated in one direction about said center of rotation, and with said bearing unit engaging the inside of said second linearly sliding grooves, said bearing unit being moved toward the inner side of said rotary plate so that said first position can be provided by said third mold; and
   (e) said rotary plate being rotated in the other direction about said center of rotation, and with said bearing unit engaging the inside of said second grooves, said bearing unit is moved toward the outer side of said rotary plate so that said second position can be provided by said third mold.

* * * * *